US008798869B2

(12) United States Patent
Ohnuma et al.

(10) Patent No.: US 8,798,869 B2
(45) Date of Patent: Aug. 5, 2014

(54) VEHICLE MOTION CONTROL SYSTEM

(75) Inventors: Yutaka Ohnuma, Miyoshi (JP);
Yasuaki Tsurumi, Nagoya (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 67 days.

(21) Appl. No.: 13/496,941

(22) PCT Filed: Oct. 30, 2009

(86) PCT No.: PCT/JP2009/068706
§ 371 (c)(1),
(2), (4) Date: Mar. 19, 2012

(87) PCT Pub. No.: WO2011/052076
PCT Pub. Date: May 5, 2011

(65) Prior Publication Data
US 2012/0185136 A1    Jul. 19, 2012

(51) Int. Cl.
*B60R 22/00* (2006.01)
*E05F 15/00* (2006.01)
*G05D 1/00* (2006.01)

(52) U.S. Cl.
USPC .............................. 701/48; 701/38; 280/5.507

(58) Field of Classification Search
USPC .............. 701/36, 38, 42, 48, 69, 70; 340/438;
303/6.15, 9.67, 9.71, 20, 113.2, 146;
280/5.502, 5.509, 6.15, 124.1, 124.13,
280/267, 5.507; 180/6.5, 65.1, 190, 210,
180/240, 282, 413, 446
See application file for complete search history.

(56) References Cited

U.S. PATENT DOCUMENTS

| 5,104,143 | A | 4/1992 | Yonekawa |
| 6,141,604 | A | 10/2000 | Mattes et al. |
| 6,315,373 | B1 | 11/2001 | Yamada et al. |
| 2004/0128060 | A1 | 7/2004 | Park |
| 2005/0251316 | A1 | 11/2005 | Kato et al. |
| 2007/0144799 | A1* | 6/2007 | Vasant .................... 180/65.1 |
| 2007/0290473 | A1* | 12/2007 | Buma ................. 280/124.106 |
| 2008/0290618 | A1* | 11/2008 | Yanaka et al. ............. 280/6.15 |
| 2009/0152940 | A1* | 6/2009 | Mercier et al. ............ 303/113.2 |

FOREIGN PATENT DOCUMENTS

| CN | 1304237 C | 3/2007 |
| CN | 100333948 C | 8/2007 |
| GB | 2 368 400 A | 5/2002 |
| JP | 3-112710 | 5/1991 |

(Continued)

*Primary Examiner* — Tuan C. To
*Assistant Examiner* — Isaac Smith
(74) *Attorney, Agent, or Firm* — Oblon, Spivak, McClelland, Maier & Neustadt, L.L.P.

(57) ABSTRACT

A vehicle motion control system for a vehicle having a single front wheel, a right wheel and a left wheel. The control system includes (a) a rollover-probability judging portion configured to judge whether or not a vehicle-body acceleration falls in a high rollover-probability region; and (b) a rollover-prevention control executing portion configured, when the acceleration falls in the high rollover-probability region, to execute a rollover prevention control for controlling motion of the vehicle so as to reduce the probability of rollover of the vehicle. The rollover-probability judging portion is configured to obtain a direction and a magnitude of the acceleration by composing a component of the acceleration in a longitudinal direction of the vehicle and a component of the vehicle-body acceleration in a width direction of the vehicle. The high rollover-probability region is defined by a threshold whose amount varies depending on the direction of the vehicle-body acceleration.

18 Claims, 15 Drawing Sheets

(56) References Cited

FOREIGN PATENT DOCUMENTS

| | | |
|---|---|---|
| JP | 3-125687 | 12/1991 |
| JP | 2000-510407 | 8/2000 |
| JP | 2000-335388 | 12/2000 |
| JP | 2002-19485 | 1/2002 |
| JP | 2002-22766 | 1/2002 |
| JP | 2004-66940 | 3/2004 |
| JP | 2004-98849 | 4/2004 |
| JP | 2004-210256 | 7/2004 |
| JP | 2006-130985 | 5/2006 |
| JP | 2007-15584 | 1/2007 |

* cited by examiner (a)

(b)

VEHICLE MOTION CONTROL SYSTEM

TECHNICAL FIELD

The present invention relates to a vehicle having a single front wheel disposed in a front portion of the vehicle and right and left wheels disposed in respective right and left portions of the vehicle and located on a rear side of the front wheel, and more particularly to a system for controlling motion of the vehicle.

BACKGROUND ART

In recent years, there is a study about a vehicle, as disclosed in below-identified Patent Document 1, which has a single front wheel disposed in a front portion of the vehicle and right and left wheels disposed in respective right and left portions of the vehicle and located on a rear side of the front wheel. Further, there is a study about a vehicle, as disclosed in below-identified Patent Document 2, which has, in addition to the front wheel and right and left wheels, a single wheel disposed in a rear portion of the vehicle, namely, a vehicle in which four wheels are arranged in a diamond-shaped arrangement.

PRIOR ART DOCUMENTS

Patent Documents

[Patent Document 1] JP-2006-130985A
[Patent Document 2] CN 1304237 C
[Patent Document 3] JP-2004-66940A

SUMMARY OF THE INVENTION

Object to be Achieved by the Invention

In study of rollover of an ordinary vehicle with four wheels arranged in respective four corners of the vehicle, rollover of the vehicle in a direction other than a width direction of the vehicle does not have to be taken into consideration. For example, the above-identified Patent Document 3 discloses a technique of preventing rollover of the vehicle with the four wheels arranged in the respective four corners, by controlling a braking force applied to each of the four wheels such that a lateral acceleration of the vehicle does not exceed a limit value. On the other hand, in case of rollover of the vehicle described in each of the above-identified Patent Documents 1 and 2, the rollover is most likely to be caused in a diagonally forward direction of the vehicle. The present invention was made in the light of the background art discussed above, and has an object of the invention to provide a vehicle motion control system which is to be installed on a vehicle having a single front wheel disposed in a front portion of the vehicle and right and left wheels disposed in respective right and left portions of the vehicle and located on a rear side of the front wheel, for controlling motion of the vehicle, more particularly, a vehicle motion control system capable of preventing rollover of the vehicle in a diagonally forward direction of the vehicle.

Measures for Achieving the Object

A vehicle motion control system according to the present invention is to be installed on a vehicle having a single front wheel disposed in a front portion of the vehicle and right and left wheels disposed in respective right and left portions of the vehicle and located on a rear side of the front wheel, and is characterized by controlling motion of the vehicle so as to reduce a probability of rollover of the vehicle, when a vehicle-body acceleration of a vehicle body composed of a longitudinal acceleration that is a component of the vehicle-body acceleration in a longitudinal direction of the vehicle and a lateral acceleration that is a component of the vehicle-body acceleration in a width direction of the vehicle, falls in a high rollover-probability region defined by a threshold that varies depending on a direction of the vehicle-body acceleration.

Effects of the Invention

In case of a vehicle having a single front wheel disposed in a front portion of the vehicle and right and left wheels disposed in respective right and left portions of the vehicle and located on a rear side of the front wheel, a magnitude of force enough to cause rollover of the vehicle varies depending on a direction of the force. In the vehicle motion control system according to the present invention, when a vehicle-body acceleration falls in a high rollover-probability region defined by a threshold that is dependent on a direction of the vehicle-body acceleration, the motion of the vehicle is controlled in such a manner that reduces the probability of rollover of the vehicle, so that it is possible to prevent the rollover of the vehicle even if the force acts on the vehicle body in any direction.

MODES OF THE INVENTION

There will be described various modes of the invention (hereinafter referred to as "claimable invention" where appropriate) deemed to contain claimable features for which protection is sought. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiment of the invention. In a limit in accordance with such an interpretation, a mode of the claimable invention can be constituted by not only any one of these modes but also either a mode provided by any one of these modes and additional component or components incorporated therein and a mode provided by any one of these modes without some of components recited therein.

In the following modes, mode (1) corresponds to claim 1; mode (8) corresponds to claim 2; a combination of modes (6) and (7) corresponds to claim 3; modes (11) through (13) correspond to claims 4 through 6, respectively; a combination of modes (14) and (15) corresponds to claim 7; mode (16) corresponds to claim 8; modes (21) and (22) correspond to claims 9 and 10, respectively; and modes (31) through (35) correspond to claim 11 through 15, respectively.

(1) A vehicle motion control system to be installed on a vehicle having a plurality of wheels that include a single front wheel, a right wheel and a left wheel, the single front wheel being disposed in a front portion of the vehicle, the right and left wheels being disposed in respective right and left portions of the vehicle and located on a rear side of the single front wheel, the control system being configured to control motion of the vehicle, the control system being capable of executing a rollover prevention control for controlling the motion of the vehicle so as to reduce a probability of rollover of the vehicle, when a vehicle body acceleration, as an acceleration of a body of the vehicle, composed of a longitudinal acceleration that is a component of the vehicle-body acceleration in a longitudinal direction of the vehicle and a lateral acceleration that is a component of the vehicle-body acceleration in a width direction of the vehicle, falls in a high rollover-probability region defined by a threshold that varies depending on a direction of the vehicle-body acceleration.

The vehicle motion control system described in this mode is to be installed on the vehicle in which three wheels are arranged in a triangular-shaped arrangement. It is noted that the vehicle, on which the vehicle motion control system of this mode is to be installed, is not limited to a three-wheeled vehicle. For example, as described later in detail, the vehicle may be a so-called diamond-shaped wheel-arrangement vehicle that further has a rear wheel located on a rear side of the right and left wheels. In the vehicle in which three wheels are arranged in the triangular-shaped arrangement, only a single wheel as the front wheel is disposed in a widthwise center of a front portion of the vehicle, so that a distance between a center of gravity of the vehicle and a straight line connecting the front and left wheels and a distance between the center of gravity and a straight line connecting the front and right wheels are shorter than a distance between the center of gravity and the left wheel in the width direction and a distance between the center of gravity and the right wheel in the width direction. Therefore, rollover of the vehicle is easily caused in a diagonally forward direction of the vehicle. Specifically, in a state in which the vehicle is being braked and turned, for example, there is a possibility that the vehicle is rolled over due to a force that acts on the vehicle body in the diagonally forward direction of the vehicle as a natural result of the braking and turning of the vehicle. It is noted that the "state in which the vehicle is being braked and turned" (hereinafter simply referred to as "braking and turning" where appropriate) is not limited to a state in which an operator of the vehicle is carrying out a braking operation in addition to a steering operation, but should be interpreted to mean also a state in which a steering operation is being carried out with a braking force being acting on a wheel of the vehicle due to a resistance by friction between a road surface and a tire of the vehicle, i.e., due to an engine brake and a rotational resistance of a driving motor, namely, a state in which a steering operation is being carried out with a running velocity of the vehicle being reduced due to a current condition of the vehicle.

In a vehicle as described above, a magnitude of force enough to cause rollover of the vehicle varies depending on a direction of the force. The vehicle motion control system described in this mode is constructed to control motion of the vehicle so as to reduce a probability of rollover of the vehicle, when the vehicle-body acceleration falls inside the high rollover-probability region that is defined by the threshold (e.g., whose amount) that varies depending on a direction of the vehicle-body acceleration. That is, in the system described in this mode, it is possible to prevent the rollover of the vehicle even if the force acts on the vehicle body in any direction. It is noted that the "vehicle-body acceleration", which is used to judge whether the probability of the rollover of the vehicle is high or not in the system described in this mode, is an acceleration of the vehicle body which can be appreciated in a view as seen from an upper side of the vehicle. It is further noted that the longitudinal acceleration is a component of the vehicle-body acceleration, which is caused by mainly a braking force applied to the vehicle, and that the lateral acceleration is a component of the vehicle-body acceleration, which is caused by mainly turning of the vehicle.

The "rollover prevention control", which is to be executed in the system described in this mode, is not limited to any particular control method. As described later in detail, it is possible to employ, as the rollover prevention control, any of various controls for reducing the probability of rollover of the vehicle, for example, by controlling various devices provided in the vehicle on which the system of this mode is to be installed.

(2) The vehicle motion control system according to mode (1), being to be installed on the vehicle in which the front wheel is a steerable wheel.

(3) The vehicle motion control system according to mode (1) or (2), being to be installed on the vehicle in which the right and left wheels are drive wheels and are drivable independently of each other.

In each of the above two modes, the vehicle on which the vehicle motion control system is to be installed has a construction specified in the mode. It is noted that the "steerable wheel" described in the former mode means a wheel whose turning amount is to be changed in a response to a steering operation carried out by the vehicle operator.

(4) The vehicle motion control system according to any one of modes (1)-(3), being to be installed on the vehicle further having a single rear wheel located on a rear side of the right and left wheels.

(5) The vehicle motion control system according to mode (4), being to be installed on the vehicle in which the rear wheel is a steerable wheel.

In each of the above two modes, the vehicle on which the vehicle motion control system is to be installed has a wheel arrangement specified in the mode in which four wheels are arranged in a diamond-shaped arrangement. In the latter mode, the rear wheel, as well as at least one of the front, left and right wheels which is a steerable wheel, is a steerable wheel. In the latter mode, it is possible to reduce a minimum turning radius of the vehicle by employing, for example, an arrangement in which the rear wheel can be turned in a phase opposite to the front wheel.

(6) The vehicle motion control system according to any one of modes (1)-(5), including:

a rollover-probability judging portion configured to judge whether or not the vehicle-body acceleration falls in the high rollover-probability region; and a rollover-prevention control executing portion configured, when it is judged by the rollover-probability judging portion that the vehicle-body acceleration falls in the high rollover-probability region, to execute the rollover prevention control.

In the control system described in this mode, the "vehicle-body acceleration", which is used for the determination as to whether the probability of rollover of the vehicle is high or not, may be either a value actually detected by a sensor or the like, or a value estimated from, for example, amounts of the steering operation and the braking operation carried out by the vehicle operator, as described later in detail.

(7) The vehicle motion control system according to mode (6), wherein the rollover-probability judging portion is configured to estimate the vehicle-body acceleration of the vehicle body, based on a steering operation and a braking operation, and is configured to judge whether the estimated vehicle-body acceleration falls in the high rollover-probability region.

When the vehicle-body acceleration, which would be caused in an assumed case where the steerable wheel is turned by a normal control executed in a response to the steering operation carried out by the vehicle operator while the braking force is generated by a normal control executed in a response to the braking operation carried out by the vehicle operator, falls in the high rollover-probability region, it is considered that the probability of rollover of the vehicle is made high by executions of the normal controls for the steerable wheel and the braking force. In the control system described in this mode, by using the vehicle-body acceleration estimated as described above, it is possible to execute the rollover prevention control before the probability of rollover becomes high. That is, according to the system described in this mode, it is possible to avoid the probability of rollover of the vehicle from becoming high and accordingly to more reliably prevent rollover of the vehicle.

(8) The vehicle motion control system according to any one of modes (1)-(7), wherein the rollover prevention control is executed for controlling the motion of the vehicle such that the vehicle-body acceleration falls outside the high rollover-probability region.

In the control system described in this mode, since the vehicle-body acceleration can be caused to fall outside the high rollover-probability region, it is possible to reliably reduce the probability of the vehicle and to prevent rollover of the vehicle. It is noted that the rollover prevention control is not limited to any particular control method. As described later in detail, it is possible to employ, as the rollover prevention control, any of various controls for causing the vehicle-body acceleration to fall outside the high rollover-probability region, for example, by controlling various devices provided in the vehicle on which the system of this mode is to be installed.

(11) The vehicle motion control system according to any one of modes (1) through (8), wherein the rollover prevention control includes a motion-amount limit control that is executed for limiting a braking force applied to the vehicle and/or a turning amount of at least one steerable wheel that is constituted by at least one of the plurality of wheels.

The control system described in this mode is capable of executing the rollover prevention control specified in this mode. That is, the rollover prevention control is executed for reducing the probability of rollover of the vehicle by limiting either one or both of the turning amount of the steerable wheel and the braking force applied to the vehicle. The "motion-amount limit control" may be, for example, a control that is to be executed for limiting each of at least one of the turning amount and the braking force, to a value that is determined depending on a condition of the vehicle. In a state where at least one of the turning amount and the braking force is caused to exceed a limit value by executions of controls of the steerable wheel and the braking force while the probability of rollover of the vehicle is low, the at least one of the turning amount and the braking force is limited by execution of the motion-amount limit control whereby the at least one of the turning amount and the braking force is reduced.

(12) The vehicle motion control system according to mode (11), wherein the motion-amount limit control is executed for limiting both of the braking force and the turning amount of the at least one steerable wheel, such that the turning amount is more limited and the braking force is less limited when a running velocity of the vehicle is low than when the running velocity is high, and such that the turning amount is less limited and the braking force is more limited when the running velocity is high than when the running velocity is low.

For example, in a case where it is necessary to avoid an obstacle that is present in front of the vehicle, each of the steering operation and the braking operation could be carried out relatively rapidly by a relatively large amount, whereby the probability of rollover of the vehicle could be made high. In such a case, it is considered effective to change of direction of the vehicle by carrying out the steering operation rather than by braking the vehicle when the running velocity of the vehicle (hereinafter simply referred to as "vehicle velocity" where appropriate) is high, and it is considered effective to brake the vehicle by carrying out the braking operation rather than changing direction of the vehicle by the steering operation when the vehicle velocity is low. In the control system described in this mode, in the above-described case, it is possible to prevent rollover of the vehicle while sufficiently exhibiting the performance for enabling the vehicle to avoid the obstacle.

In the control system described in this mode, a higher priority may be given to a selected one of the limitation imposed on the turning amount and the limitation imposed on the braking force, which is selected depending on whether the vehicle velocity is higher or lower than a threshold value. Further, for example, the turning amount and the braking force may be more limited and less limited, respectively, when the running velocity of the vehicle is low than when the running velocity is high, and the turning amount and the braking force may be less limited and more limited, respectively, when the running velocity of the vehicle is high than when the running velocity is low. Further, the degree of the limitation imposed on the turning amount and the degree of the limitation imposed on the braking force may be changed, depending on the running velocity of the vehicle, either in a stepwise or continuous manner.

(13) The vehicle motion control system according to mode (11) or (12), wherein the motion-amount limit control is executed for limiting both of the braking force and the turning amount, such that the braking force is less limited and the turning amount is more limited when a ratio of a velocity of a braking operation to a velocity of a steering operation is high than when the ratio is low, and such that the braking force is more limited and the turning amount is less limited when the ratio is low than when the ratio is high.

In the control system described in this mode, a higher priority is given to a selected one of the limitation imposed on the turning amount and the limitation imposed on the braking force, which is selected based on the velocity of the steering operation and the velocity of the braking operation. In the control system described in this mode, one of the turning amount and the braking force, which corresponds to one of the steering operation and the braking operation that is regarded more important by the vehicle operator, is less limited. Thus, it is possible to prevent rollover of the vehicle while reducing discomfort given to the vehicle operator.

In the control system described in this mode, a selected one of the turning amount and the braking force, which is selected depending on whether the ratio (hereinafter referred to as "operation velocity ratio" where appropriate) of the velocity of the braking operation to the velocity of the steering operation is higher or lower than a threshold value, may be more limited. Further, for example, the braking force and the turning amount may be less limited and more limited, respectively, when the operation velocity ratio is high than when the operation velocity ratio is low, and the braking force and the turning amount may be more limited and less limited, respectively, when the operation velocity ratio is low than when the operation velocity ratio is high. Further, the degree of the limitation imposed on the turning amount and the degree of the limitation imposed on the braking force may be changed, depending on the operation velocity ratio, either in a stepwise or continuous manner.

(14) The vehicle motion control system according to any one of modes (11)-(13), wherein the motion-amount limit control is executed for limiting the braking force and/or the turning amount such that the vehicle-body acceleration falls outside the high rollover-probability region.

In the control system described in this mode, the motion-amount limit control is executed for causing the vehicle-body acceleration to fall outside the high rollover-probability region. Owing to the motion-amount limit control, it is possible to reliably reduce the probability of rollover of the vehicle and to prevent the rollover of the vehicle.

(15) The vehicle motion control system according to mode (14), being configured to execute a steering control for controlling the turning amount such that the lateral acceleration becomes a value dependent on a steering operation and to execute a braking force control for controlling the braking force such that the longitudinal acceleration becomes a value dependent on a braking operation, wherein the motion-amount limit control is to be executed for limiting the braking force and the turning amount, such that the braking force is limited by controlling the braking force based on a longitudinal component of a target acceleration which is parallel to the longitudinal direction, and such that the turning amount is limited by controlling the turning amount based on a lateral component of the target acceleration which is parallel to the width direction, the target acceleration being a target of the vehicle-body acceleration that is determined so as to fall outside the high rollover-probability region.

In the control system described in this mode, the turning amount of the steerable wheel and the braking force applied to the vehicle are limited by limiting the vehicle-body acceleration for which the turning amount and the braking force are to be controlled. That is, in the control system described in this mode, the vehicle-body acceleration which falls inside the high rollover-probability region, is not caused so that rollover of the vehicle is prevented.

The "steering control" described in this mode may be executed to determine a target lateral acceleration as the lateral component of the target acceleration which is parallel to the width direction of the vehicle, based on, for example, an operating angle of the steering operation, and then to control the turning amount of the steerable wheel such that the lateral acceleration is equalized to the target lateral acceleration. Further, the "braking force control" described in this mode may be executed to determine a target longitudinal acceleration as the longitudinal component of the target acceleration which is parallel to the longitudinal direction of the vehicle, based on, for example, an operating amount of the braking operation, and then to control the braking force applied to the vehicle such that the longitudinal acceleration is equalized to the target longitudinal acceleration. When the vehicle-body acceleration composed of the target lateral acceleration and the target longitudinal acceleration falls in the high rollover-probability region, it is considered that the probability of rollover of the vehicle is high. The control system described in this mode may include a target-acceleration determining portion which is configured to determine a target vehicle-body acceleration corresponding to a limited or corrected vehicle-body acceleration (composed of the target lateral acceleration and the target longitudinal acceleration) which is limited or corrected so as to fall outside the high rollover-probability region.

(16) The vehicle motion control system according to mode (15), wherein the target acceleration is determined in execution of the motion-amount limit control, such that the determined target acceleration has an intermediate direction that is intermediate between a direction of a turning-amount limited acceleration and a direction of a braking-force limited acceleration, and such that the determined target acceleration has a magnitude equalized to a value of the threshold which is dependent on the intermediate direction, the turning-amount limited acceleration being defined as the vehicle-body acceleration which is to fall outside the high rollover-probability region and which is to be obtained by limiting the turning amount without limiting the braking force, the braking-force limited acceleration being defined as the vehicle-body acceleration which is to fall outside the high rollover-probability region and which is to be obtained by limiting the braking force without limiting the turning amount.

In the control system described in this mode, both of the turning amount of the steerable wheel and the braking force applied to the vehicle are limited to suitable values so as to prevent rollover of the vehicle.

(21) The vehicle motion control system according to any one of modes (1)-(16), wherein the rollover prevention control includes a vehicle-body tilt control that is to be executed for tiling the vehicle body in such a direction that reduces the probability of rollover of the vehicle.

The control system described in this mode is capable of executing the rollover prevention control specified in this mode. That is, the rollover prevention control is executed for forcedly tilting the vehicle body in such a direction that does not cause rollover of the vehicle. Described in detail, in the control system described in this mode, the rollover prevention control is executed for reducing the probability of rollover of the vehicle, by shifting a center of gravity of the vehicle body, away from a straight line connecting the front wheel and the right wheel or away from a straight line connecting the front wheel and the left wheel.

(22) The vehicle motion control system according to mode (21), wherein the vehicle-body tilt control is to be executed for tilting the vehicle body such that a center of gravity of the vehicle body is shifted in an opposite direction that is opposite to the direction of the vehicle-body acceleration in a plan view of the vehicle.

In the control system described in this mode, the center of gravity of the vehicle body can be more effectively shifted away from the straight line connecting the front wheel and the right wheel or away from the straight line connecting the front wheel and the left wheel.

(23) The vehicle motion control system according to mode (22), wherein the vehicle-body tilt control is to be executed for tilting the vehicle body such that the center of gravity of the vehicle body is shifted by a given amount that is determined such that the vehicle-body acceleration falls outside the high rollover-probability region.

In the control system described in this mode, the vehicle-body tilt control is executed for causing the vehicle-body acceleration described above, to fall outside the high rollover-probability region. Thus, owing to execution of the vehicle-body tilt control, it is possible to reliably reduce the probability of rollover of the vehicle and accordingly to prevent the rollover of the vehicle. Further, in the control system described in this mode, an amount of tilting of the vehicle body, which is required to cause the vehicle-body acceleration to fall outside the high rollover-probability region, is small so that the rollover of the vehicle can be effectively prevented.

(24) The vehicle motion control system according to any one of modes (21)-(23), being to be installed on the vehicle further having a plurality of wheel-body-distance changing devices each of which is provided for a corresponding one of the plurality of wheels and each of which is configured to change a wheel-body distance between the corresponding one of the wheels and the vehicle body, wherein the vehicle-body tilt control is to be executed to tilt the vehicle body by controlling the plurality of wheel-body-distance changing devices.

(25) The vehicle motion control system according to mode (24), wherein the vehicle-body tilt control is to be executed to tilt the vehicle body by controlling the plurality of wheel-body-distance changing devices, such that the wheel-body distance between the right wheel and the vehicle body and the wheel-body distance between the front wheel and the vehicle body are increased and/or the wheel-body distance between the left wheel and the vehicle body is reduced, in case of a high probability of rollover of the vehicle caused in a right-forward direction, and such that the wheel-body distance between the left wheel and the vehicle body and the wheel-body distance between the front wheel and the vehicle body are increased and/or the wheel-body distance between the right wheel and the vehicle body is reduced, in case of a high probability of rollover of the vehicle caused in a left-forward direction.

In the control system described in each of the above two modes, the vehicle body is tilted in a manner specified in each of the two modes. The "wheel-body-distance changing device" described in each of the two modes is not particularly limited, as long as the device is capable of changing the wheel-body distance. However, it is preferable that the device is capable of changing the wheel-body distance within a length of time as short as possible. That is, it is possible to employ, as the wheel-body-distance changing device, an electromagnetic shock absorber including an electromagnetic motor and capable of generating a force which is based on a force generated by the electromagnetic motor and which forces the wheel and the vehicle body to be displaced toward or away from each other, so that it is possible to cause the electromagnetic shock absorber to generate the driving force forcing the wheel and the vehicle body to be displaced toward or away from each other and accordingly to cause the wheel and the vehicle body to be displaced toward or away from each other.

(31) The vehicle motion control system according to any one of modes (1)-(23), wherein the rollover prevention control includes a steering-characteristic changing control that is to be executed for increasing an understeering tendency of the vehicle.

The control system described in this mode is capable of executing the rollover prevention control specified in this mode. That is, in the control system described in this mode, when the vehicle-body acceleration falls in the high rollover-probability region, a steering characteristic of the vehicle is changed to increase the understeering tendency of the vehicle such that the understeering tendency is higher than when the vehicle-body acceleration falls outside the high rollover-probability region. Further, in the control system described in this mode, the rollover prevention control can be considered as a control for reducing a yaw rate or increasing a turning radius. That is, in the control system described in this mode, the direction of the vehicle-body acceleration is changed toward a direction away from the center of gravity of the vehicle body toward the front wheel, such that the vehicle-body acceleration is caused to fall outside the high rollover-probability region, for thereby preventing rollover of the vehicle. It is noted that the term "increasing an understeering tendency of the vehicle", which is recited in this mode, is a concept including also reduction of an oversteering tendency of the vehicle where the vehicle has the oversteering tendency as the steering characteristic.

The method of increasing the understeering tendency of the vehicle in this mode is not particularly limited. That is, the understeering tendency may be increased by employing various methods as described later in detail. Further, in this mode, two or more of the various methods may be carried out concurrently with each other. Further, it is possible to execute, as the above-described rollover prevention control, at least one of (i) a control for limiting the turning amount of the steerable wheel and/or the braking force applied to the vehicle and (ii) a control for tilting the vehicle body. Where the two controls are executed, they may be executed concurrently with each other.

(32) The vehicle motion control system according to mode (31), wherein the steering-characteristic changing control includes a control that is to be executed, upon turning of the vehicle, for making a braking force applied to one of the right and left wheels which serves as an outside wheel, larger than a braking force applied to the other of the right and left wheels which serves as an inside wheel.

In the control system described in this mode, a yaw moment of the vehicle is reduced by establishing a difference between the braking forces applied to the respective left and right wheels, so as to increase the understeering tendency of the vehicle. Specifically, the understeering tendency of the vehicle can be increased by reducing the braking force applied to the inside wheel and/or increasing the braking force applied to the outside wheel. Where the total braking force applied to the vehicle should not be changed, it is preferable that the understeering tendency is increased by changing a ratio of distribution of the braking force between the left and right wheels. However, the difference between the braking forces applied to the respective left and right wheels may be established by reducing the braking force applied to the inside wheel without changing the braking force applied to the outside wheel. In this arrangement, the total braking force applied to the vehicle is reduced. That is, this arrangement can be considered to correspond to the above-described arrangement in which the braking force applied to the vehicle is limited, or correspond to an arrangement in which the control for limiting the braking force applied to the vehicle and the control described in this mode are executed in change with each other.

(33) The vehicle motion control system according to mode (31) or (32), wherein the steering-characteristic changing control includes a control that is to be executed for changing a camber angle of at least one of the plurality of wheels.

In the control system described in this mode, specifically described, for example, an upper portion of the front wheel of the vehicle may be inclined in a direction away from a center of turning of the vehicle, for thereby changing the camber angle of the front wheel with respect to a road surface such that a camber thrust of the front wheel is reduced whereby the understeering tendency of the vehicle is increased. Further, regarding the left and right wheels of the vehicle, each of the left and right wheels may be inclined in a direction dependent on whether each of the left and right wheels is located on front or rear side of the center of gravity of the vehicle body. That is, where each of the left and right wheels is located on the rear side of the center of gravity of the vehicle body, the understeering tendency of the vehicle can be increased by inclining an upper portion of each of the left and right wheels in a direction toward the center of turning of the vehicle. Where each of the left and right wheels is located on the front side of the center of gravity of the vehicle body, the understeering tendency of the vehicle can be increased by inclining the upper portion of each of the left and right wheels in a direction away from the center of turning of the vehicle. Still further, where the vehicle (on which the present control system is installed) has a rear wheel, the understeering tendency of the vehicle can be increased by causing an upper portion of the rear wheel to be inclined in a direction toward the center of turning of the vehicle.

(34) The vehicle motion control system according to any one of modes (31)-(33), wherein the steering-characteristic changing control includes a control that is to be executed for changing a toe angle of each of the right and left wheels.

In the control system described in this mode, specifically described, for example, the toe angle of each of the left and right wheels is changed, such that the wheel has a toe-in where each of the left and right wheels is located on the rear side of the center of gravity of the vehicle body, and such that the wheel has a toe-out where each of the left and right wheels is located on the front side of the center of gravity of the vehicle body.

(35) The vehicle motion control system according to any one of modes (31)-(34) being to be installed on the vehicle further having a single rear wheel which is a steerable wheel and which is located on a rear side of the right and left wheels, wherein the steering-characteristic changing control includes a control that is to be executed for turning the rear wheel in the same direction as the front wheel.

In the control system described in this mode, a yaw moment acting in a direction toward a center of turning of the vehicle is reduced by causing the rear wheel to be steered in-phase with the front wheel, whereby the understeering characteristic of the vehicle is increased.

MODES FOR CARRYING OUT THE INVENTION

There will be described some embodiments and the modification as best modes for carrying out the claimable invention, by reference to the accompanying drawings. It is to be understood that the claimable invention is not limited to the below-described embodiments, and may be otherwise embodied with various changes and modifications, such as those described in the foregoing "MODES OF THE INVENTION", which are based on knowledge of those skilled in the art. Further, it is to be understood that the below-described embodiments may be modified by utilizing technical matters described in description relating to each mode in "MODES OF THE INVENTION".

[Embodiment 1]
<Construction of Vehicle Equipped with Vehicle Motion Control System>

Figure 1:
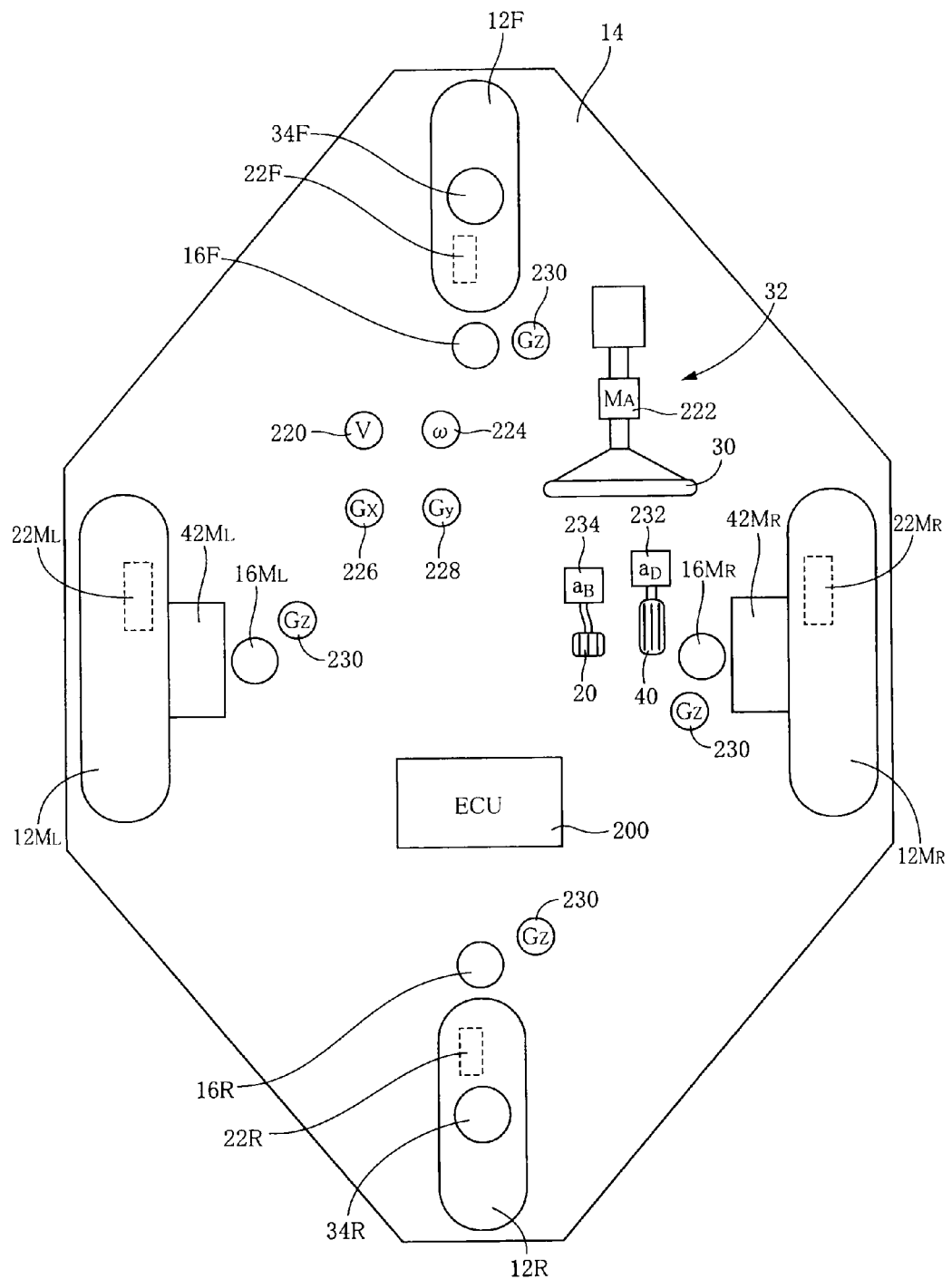
FIG. 1 is a view schematically showing an overall construction of a vehicle on which a vehicle motion control system according to a first embodiment of the claimable invention is to be installed.

FIG. 1 schematically shows a vehicle on which a vehicle motion control system as a first embodiment of the claimable invention is to be installed. This vehicle has a four wheels 12 that are arranged in a diamond-shaped arrangement. Described in detail, the vehicle has a front wheel 12F disposed in a front portion of the vehicle; right and left wheels $12M_R$, $12M_L$ disposed in respective widthwise opposite end portions of the vehicle and located in an intermediate portion of the vehicle in a longitudinal direction of the vehicle; and a rear wheel 12R disposed in a rear portion of the vehicle. Further, this vehicle is equipped with a suspension system including four independent-type suspension devices 16 provided for the respective four wheels 12 such that each of the suspension devices 16 is disposed between a vehicle body 14 and a corresponding one of the four wheels 12F, 12M$_R$, 12M$_L$, 12R. Further, this vehicle is equipped with also a brake system which is of a so-called electromechanical brake (EMB). Described in detail, this brake system is physically sectioned into a braking operation device and four braking devices 22. The braking operation device is constituted principally by a brake pedal 20, while the four braking devices 22 are provided for the respective four wheels 12. The brake system is configured to generate a braking force for each of the wheels 12, by a power generated by a power source included in a corresponding one of the braking devices 22. It is noted that the suspension devices 16 and the braking devices 22 are generic terms, and that each of the suspension devices 16 and braking devices 22 will be referred together with, as a suffix, one of reference signs F, R, M$_R$ and M$_L$ indicative of respective wheel positions, where it is necessary to clarify which one of the front and rear wheels 12F, 12R and right and left wheels 12M$_R$, 12M$_L$ the referred device relates to.

In the present vehicle, among the four wheels 12, the front wheel 12F and the rear wheel 12R are steerable wheels. The present vehicle is equipped with also a steering system which is of a so-called steer-by-wire type. That is, the steering system is mechanically separated into a steering operation device 32 and two steering devices 34. The steering operation device 32 is constituted principally by a steering wheel 30. The two steering devices 34 are provided for the respective front and rear wheels 12F, 12R, so that each of the front and rear wheels 12F, 12R can be turned by a power generated by a power source included in a corresponding one of the two steering devices 34, without relying on an operating force applied to the steering wheel 30. It is noted that the two steering devices 22 will be described later in detail.

In the present vehicle, among the four wheels 12, the right wheel 12M$_R$ and the left wheel 12M$_L$ are drive wheels. The present vehicle is of a so-called drive-by-wire type, and is mechanically separated into an acceleration operation device and two driving devices 42. The acceleration operation device is constituted principally by an accelerator pedal 40. The two driving devices 42 are provided for the respective right and left wheels 12M$_R$, 12M$_L$, and include respective motors. The motors of the driving devices 42 are driven in a response to operation of the accelerator pedal 40, whereby each of the right and left wheels 12M$_R$, 12M$_L$ is driven by the driven motor of a corresponding one of the driving devices 42. It is noted that the two driving devices 42 will be described later in detail.

Figure 2:
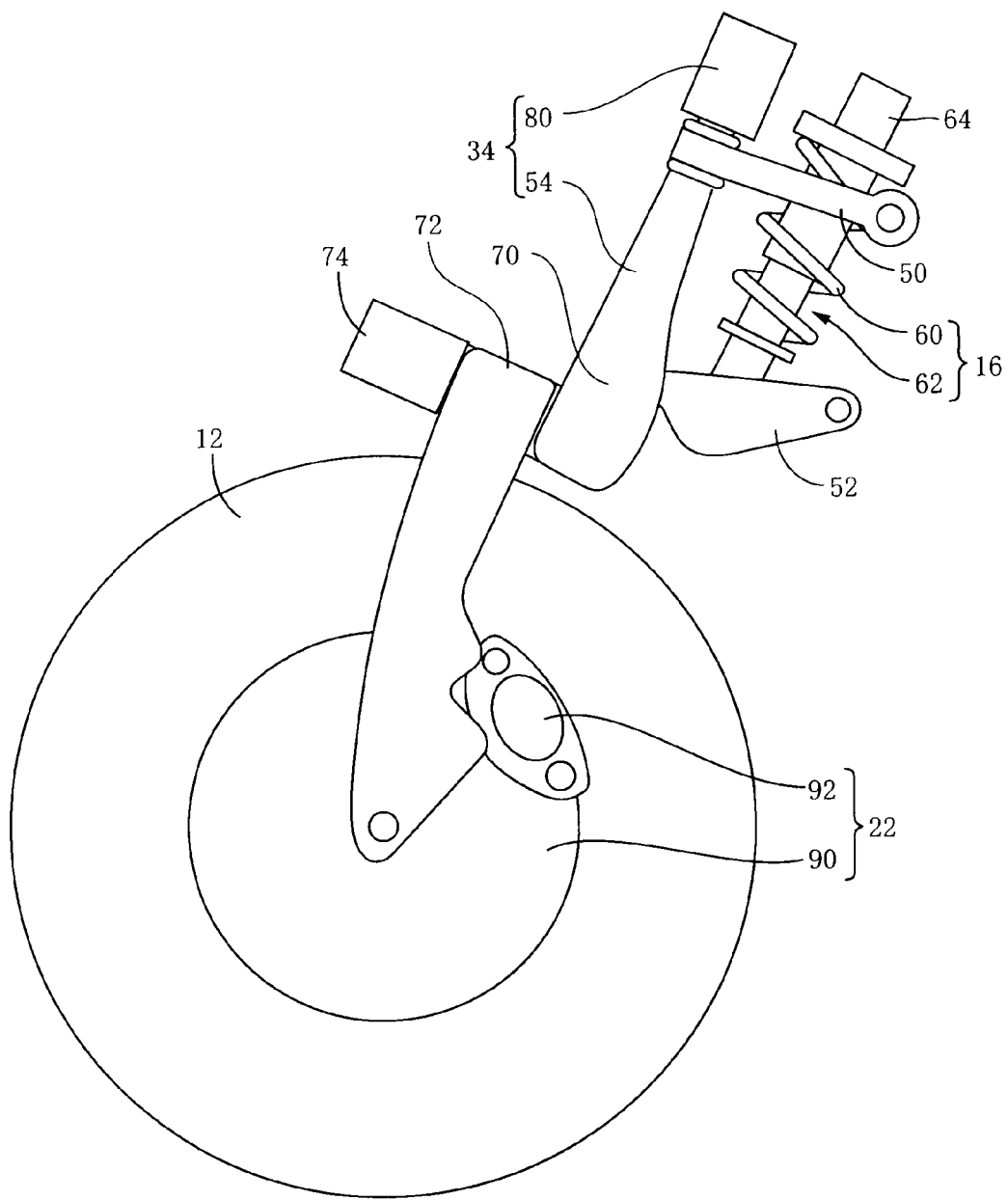
FIG. 2 is a side view showing a chassis provided for a front wheel of the vehicle.

Since the suspension devices 16 provided for the respective four wheels 12 are substantially identical in construction with one another, one of the suspension devices 16 provided for the front wheel 12F will be described as a representative one of the suspension devices 16 with reference to FIG. 2, for simplicity of the description. The suspension device 16F has a construction similar to Double wishbone suspension, and includes an upper arm 50 and a lower arm 52. Each of the upper and lower arms 50, 52 is pivotably connected at one of its opposite end portions to the vehicle body 14, and is connected at the other of its opposite end portions to an upper portion of a carrier 54 via a ball joint. Owing to such an arrangement, the carrier 54 (by which the wheel 12 is rotatably held) is vertically displaceable relative to the vehicle body 14 along a substantially constant locus, and is pivotable about a shaft (king pin shaft) interconnecting the two ball joints (by each of which a corresponding one of the upper and lower arms 50, 52 is connected at the above-described other of the opposite end portions to the carrier 54).

The suspension device 16F includes a coil spring 60 as a suspension spring and a shock absorber 62. The coil spring 60 and the shock absorber 62 are disposed in parallel with each other, between a mount portion as a sprung portion that constitutes a part of the vehicle body 14 and the lower arm 52 that constitutes a part of an unsprung portion of the vehicle. The shock absorber 62 is of a so-called electromagnetic type, and includes an electromagnetic motor 64. The shock absorber 62 is configured to generate a force which is based on a force generated by the electromagnetic motor 64 and which forces the sprung and unsprung portions to be displaced toward or away from each other. That is, the shock absorber 62 is capable of generating a damping force acting against displacement of the sprung and unsprung portions toward or away from each other. Further, owing to the force generated by the electromagnetic motor 64, the shock absorber 62 is capable of maintaining a desired distance between the sprung and unsprung portions, thereby making it possible to effectively suppress, for example, roll of the vehicle body upon turning of the vehicle and pitch of the vehicle body upon acceleration or deceleration of the vehicle. Further, the force generated by the shock absorber 62 can serve as not only the resistance force acting against displacement of the sprung and unsprung portions toward or away from each other but also a driving force causing the displacement of the sprung and unsprung portions toward or away from each other. That is, the shock absorber 62 is capable of changing a wheel-body distance, i.e., a distance between the wheel 12 and the vehicle body 14 in a vertical direction. Thus, the shock absorber 62 serves as a wheel-body-distance control device.

Figure 3:
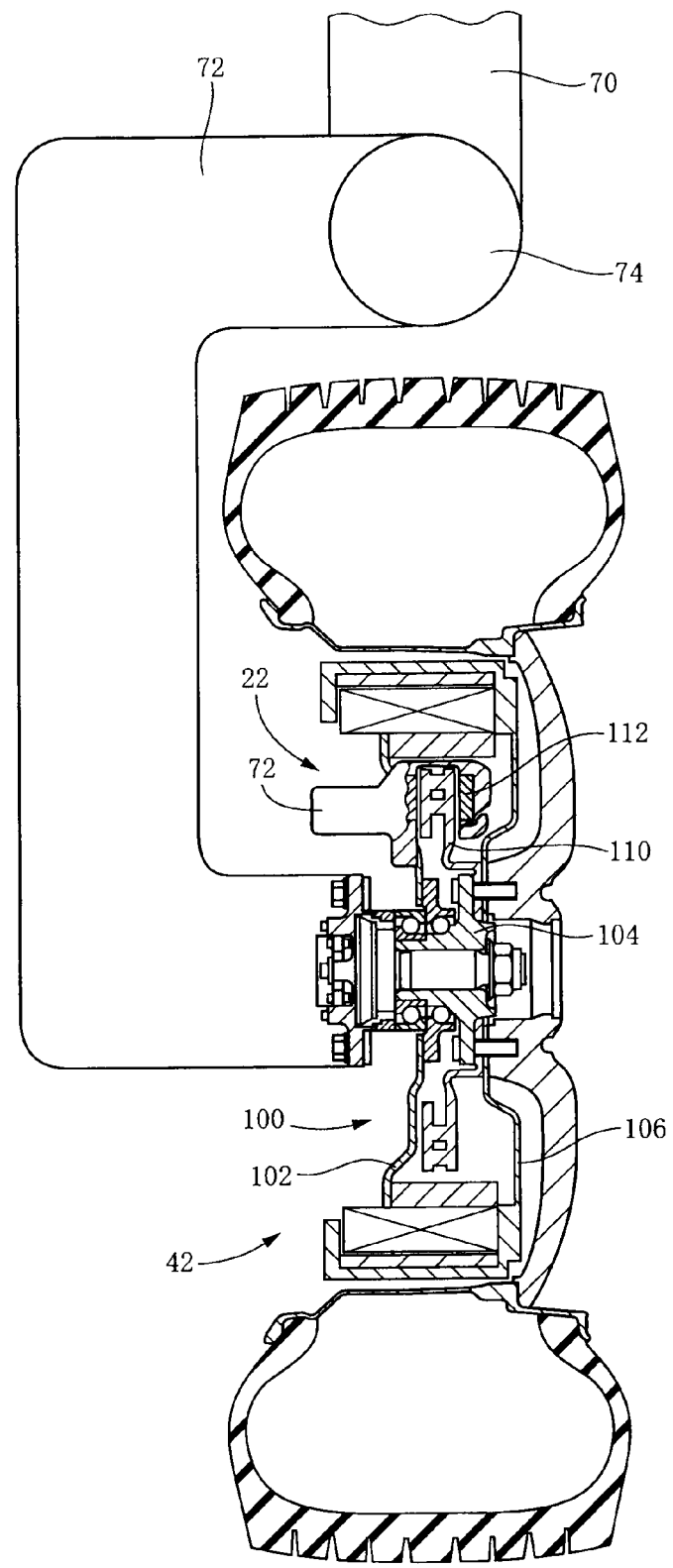
FIG. 3 is a cross sectional view of a chassis provided for a left wheel of the vehicle, as seen from a front side of the vehicle.

The carrier 54 includes a shaft portion 70 and a holder portion 72. The shaft portion 70 is connected to the above-described two arms 50, 52, and is pivotable about its axis. The holder portion 72 is connected to a lower end portion of the shaft portion 70, and is formed to have a generally U shape (see FIG. 3). The shaft portion 70 and the holder portion 72 are pivotable relative to each other about an axis that extends in a front-back direction of the wheel 12. Further, the carrier 54 has an electromagnetic motor 74 that is built inside the lower end portion of the shaft portion 70: The motor 74 has a stator fixed to the shaft portion 70 and a rotor fixed to the holder portion 72. Therefore, the electromagnetic motor 74 is capable of pivoting the holder portion 72 relative to the shaft portion 70, owing to a force generated by the motor 74. That is, the motor 74 is capable of changing a camber angle of the wheel 12.

Further, an electromagnetic motor 80 is connected to an upper end portion of the carrier 54, and has a stator held by the vehicle body 14 and a rotor fixed to the carrier 54. That is, the electromagnetic motor 80 is capable of rotating the carrier 54 about the king pin shaft, owing to a force generated by the motor 80, so that the front wheel 12F and the rear wheel 12R can be turned. That is, each of the steering devices 34F, 34R is constituted to include the electromagnetic motor 80 and the carrier 54. On the other hand, in each of the right wheel 12M$_R$ and the left wheel 12M$_L$, the carrier 54 is rotated about the king pin shaft, owing to the force generated by the electromagnetic motor 80, so as to change a toe angle of the wheel.

Each of the chassis provided for the front and rear wheels 12F, 12R is constructed to include, in addition to the above-described suspension device 16, the braking device 22 that is an electromechanical brake. As shown in FIG. 2, the braking device 22 is constructed to include a disk rotor 90 rotatable integrally with the wheel 12, a brake pad provided in the carrier 54 as a part of the vehicle which is not rotatable together with the wheel, and an electromagnetic motor 92 configured to press the brake pad against the disk rotor 90. That is, the braking device 22F is configured to generate a friction force between the disk rotor 90 and the brake pad, by relying on the force generated by the electromagnetic motor 72, and to generate the braking force constituted by the friction force.

Next, each of the chassis provided for the right and left wheels 12M$_R$, 12M$_L$ will be described. Since each of the right and left wheels 12M$_R$, 12M$_L$ is a drive wheel, each of the chassis provided for the right and left wheels 12M$_R$, 12M$_L$ is different in construction from each of the chassis provided for the front and rear wheels 12F, 12R, and is constructed to include the braking device 22 and the driving device 42 in addition to the suspension device 16. Since the chassis provided for the right wheel 12M$_R$ and the chassis provided for the left wheel 12M$_L$ can be regarded to be substantially identical in construction with each other, the chassis provided for the left wheel 12M$_L$ will be described as a representative one of the chassis with reference to FIG. 3, for simplicity of the description.

The driving device 42M$_L$ is constituted principally by an electromagnetic motor 100, which includes a stator 102 fixed to the carrier 54, a motor shaft 104 rotatably held by the carrier 54 and a rotor 106 fixed to the motor shaft 104. The wheel 12 is fixed to the motor shaft 104 so that the electromagnetic motor 100 is capable of directly rotating the wheel 12. That is, the driving device 42M$_L$ is constituted by a so-called in-wheel motor, and is configured to generate a driving force based on a force generated by the electromagnetic motor 100.

The braking device 22M$_L$ is an electromechanical brake, and has substantially the same construction as that provided for each of the front and rear wheels 12F, 12R. The braking device 22M$_L$ is configured to generate a friction force between a disk rotor 110 (fixed to the motor shaft 104) and a brake pad 112, by relying on the force generated by the electromagnetic motor 72M$_L$, and to generate the braking force constituted by the friction force.

As shown in FIG. 1, in the present vehicle, motion of the vehicle is controlled by an electronic control unit 200 (hereinafter referred to as "ECU 200" where appropriate). Specifically, the motion of the vehicle is controlled by controlling activations of the motors of the above-described four suspension devices 16, four braking devices 22, two steering devices 34 and two driving devices 42. The ECU 200 is constituted principally by a computer including CPU, ROM, RAM and the like. Although not being illustrated in the drawings, a plurality of inverters serving as drive circuits for the respective motors are connected to the ECU 200, so that an electric power is supplied to each of the motors from a corresponding one of the power sources that is connected to a corresponding one of the inverters, by controlling the corresponding inverter.

As shown in FIG. 1, the vehicle is provided with: a vehicle velocity sensor [v] 220 configured to detect a running velocity of the vehicle (hereinafter referred to as "vehicle velocity" where appropriate); an operating angle sensor [S$_A$] 222 configured to detect an operating angle of the steering wheel; a yaw rate sensor [ω] 224 configured to detect a yaw rate that is a velocity of rotation of the vehicle body 14 about a vertical axis; a longitudinal acceleration sensor [Gx] 226 configured to detect an actual longitudinal acceleration of the vehicle body 14, i.e., a longitudinal acceleration actually caused in the vehicle body 14; a lateral acceleration sensor [Gy] 228 configured to detect an actual lateral acceleration of the vehicle body 14, i.e., a lateral acceleration actually caused in the vehicle body 14; four sprung-portion vertical acceleration sensors [Gz] 230 each configured to detect a vertical acceleration of a corresponding one of the mount portions of the vehicle body 14 that corresponds to a corresponding one of the wheels 12; an acceleration stroke sensor [S$_D$] 232 configured to detect an operating amount of the accelerator pedal; and a brake stroke sensor [S$_B$] 234 configured to detect an operating amount of the brake pedal. These sensors are connected to the computer of the ECU 200, so that the ECU 200 is configured to control activations of the motors, based on signals supplied from the sensors or switches. It is noted that the character or characters in each parenthesis [ ] represents a reference sign used in a case in which the corresponding sensor or switch is shown in the drawings. It is further noted that the ROM included in the computer of the ECU 200 stores therein programs, various data and the like relating to controls that will be described later in detail.

<Vehicle Motion Control in Normal Case> i) Controls of Braking Devices

In the present vehicle motion control system, the four braking devices 22 can be controlled independently of each other, so that the braking forces applied to the respective wheels 12 are controlled independently of each other. This braking force control is a control for determining, based on the operating amount S$_B$ of the brake pedal 20, a target longitudinal acceleration Gx* of the vehicle body 14, i.e., the longitudinal acceleration of the vehicle body 14 that is to be caused, and then to apply a total braking force to the vehicle such that the actual longitudinal acceleration is substantially equalized to the target longitudinal acceleration Gx*. Specifically described, firstly, the braking operating amount S$_B$ of the brake pedal 20 is detected by the brake stroke sensor 234. The ROM of the ECU 200 stores therein a map data of the target longitudinal acceleration Gx* in relation with a parameter in the form of the braking operating amount S$_B$, so that the target longitudinal acceleration Gx* is determined with reference to the map data. Then, a target braking force F$_B$ as the total braking force that is to be generated for the entirety of the vehicle, is determined in accordance with the following expression:

$$F_B = K_1 \cdot Gx^* \ (K_1: \text{gain})$$

Then, target braking forces F$_{B-F}$, F$_{B-ML}$, F$_{B-MR}$, F$_{B-R}$, which are to be generated by the braking device 22F provided for the front wheel 12F, the braking device 22M$_L$ provided for the left wheel 12M$_L$, the braking device 22M$_R$ provided for the right wheel 12M$_R$ and the braking device 22R provided for the rear wheel 12R, respectively, are determined based on the target braking force F$_B$ and a predetermined braking-force distribution ratio according to which the total braking force is to be distributed to the respective wheels 12. It is noted that the braking force F$_{B-ML}$ and the braking force F$_{B-MR}$, which are to be applied to the respective left and right wheels 12M$_L$, 12M$_R$, are normally made equal in magnitude to each other. It is further noted that, when a regenerative braking by the electromagnetic motors 100 of the driving devices 42 is being available, a higher priority may be given to braking forces generated by the regenerative braking, so that the braking forces of the braking devices 22 are determined with the higher priority being given to the braking forces of the regenerative braking.

The motors 92 are controlled by the inverters such that the barking forces applied to the respective wheels 12 are substantially equalized to the respective target braking forces F$_{B-F}$, F$_{B-ML}$, F$_{B-MR}$, F$_{B-R}$. Described in detail, commands representing duty ratios determined based on the respective target braking forces F$_{B-F}$, F$_{B-R}$ are supplied to the respective inverters, so that the activations of the motors 92 are controlled, in accordance with the respective commands, by the respective inverters.

ii) Control of Steering Devices

In the present vehicle motion control system, the two steering devices 34 can be controlled independently of each other, so that turns of the respective front and rear wheels 12F, 12R are controlled independently of each other. This steering control is a control for determining, based on the operating amount of the steering wheel 30 and the vehicle velocity, a target lateral acceleration Gy* of the vehicle body 14, i.e., the lateral acceleration is of the vehicle body 14 that is to be caused, and then to turn the front and rear wheels 12F, 12R such that the actual lateral acceleration is substantially equalized to the target lateral acceleration Gy*. Specifically described, firstly, the target lateral acceleration Gy* is calculated based on the operating angle $S_A$ of the steering wheel 30 detected by the operating angle sensor 222 and the vehicle velocity v detected by the vehicle velocity sensor 220, in accordance with the following expression:

$$Gy^* = K_2 \cdot \{v/(1+Kh \cdot v^2)\} \cdot S_A$$

($K_2$: gain, Kh: target stability factor)

Then, the actual lateral acceleration Gyr is obtained by the lateral acceleration sensor 228, and a lateral acceleration deviation ΔGy (=Gy*−Gyr) that is a deviation of the actual lateral acceleration Gyr from the target lateral acceleration Gy* is recognized. A turning angle $θ_F^*$ of the front wheel 12F and a turning angle $θ_R^*$ of the rear wheel 12R are determined such that the lateral acceleration deviation ΔGy becomes zero.

It is noted that the target turning angle $θ_F^*$ of the front wheel 12F and the target turning angle $θ_R^*$ of the rear wheel 12R are determined, in the ECU 200, based on the above-described lateral acceleration deviation ΔGy, in accordance with PDI control rules of the following expressions:

$$θ_F^* = K_{P1} \cdot θ_F \cdot \Delta Gy + K_{D1} \cdot θ_F \cdot \Delta Gy' + K_{I1} \cdot θ_F \cdot \int(\Delta Gy)dt$$

$$θ_R^* = K_{P1} \cdot θ_R \cdot \Delta Gy + K_{D1} θ_R \cdot \Delta Gy' + K_{I1} \cdot θ_R \cdot \int(\Delta Gy)dt$$

In each of the above expressions, the first, second and third terms represent a proportional term component, a derivative term component and an integral term component of the target turning angle, respectively, while "$K_P$", "$K_D$", "$K_I$" represent a proportional gain, a derivative gain and an integral gain, respectively.

iii) Control of Driving Devices

In the present vehicle motion control system, the two driving devices 42 can be controlled independently of each other, so that the driving forces applied to the respective wheels 12 are controlled independently of each other. This driving force control is a control for determining, based on the operating amount of the accelerator pedal 40, a target longitudinal acceleration Gx* of the vehicle body 14, i.e., the longitudinal acceleration of the vehicle body 14 that is to be caused, and then to give the driving force to the vehicle such that the actual longitudinal acceleration is substantially equalized to the target longitudinal acceleration Gx*. Specifically described, firstly, the acceleration operating amount $S_D$ is detected by the acceleration stroke sensor 232. The ROM of the ECU 200 stores therein a map data of the target longitudinal acceleration Gx* in relation with a parameter in the form of the acceleration operating amount $S_D$, so that the target longitudinal acceleration Gx* is determined with reference to the map data. Then, a target driving force $F_D$ as the total driving force that is to be generated for the entirety of the vehicle, is determined. Then, target driving forces $F_{D-ML}$, $F_{D-MR}$, which are to be generated by the driving device $42M_L$ provided for the left wheel $12M_L$ and the driving device $42M_R$ provided for the right wheel $12M_R$, respectively, are determined based on the target driving force $F_D$ and a predetermined driving-force distribution ratio according to which the total driving force is to be distributed to the respective left and right wheels $12M_L$, $12M_R$. It is noted that the target driving forces $F_{D-ML}$, $F_{D-MR}$ are normally made equal in magnitude to each other.

iv) Control of Electromagnetic Shock Absorbers a) Outline of Control of Shock Absorbers In the present motion control system, the four shock absorbers 62 can be controlled independently of each other. The absorber forces generated by the respective shock absorbers 62 are controlled independently of each other, for thereby executing a control (hereinafter referred to as "vibration damping control" where appropriate) for damping vibration of the vehicle body 14, i.e., a sprung portion vibration. Further, concurrently with the vibration damping control, there are executed a control (hereinafter referred to as "roll suppressing control" where appropriate) for suppressing roll of the vehicle body which could be caused by turning of the vehicle and a control (hereinafter referred to as "pitch suppressing control" where appropriate) for suppressing pitch of the vehicle body which could be caused by acceleration and deceleration of the vehicle. The vibration damping control, roll suppressing control and pitch suppressing control are totally executed, by determining a target absorber force as a target controlled value that corresponds to a sum of a vibration damping component, a roll suppressing component and a pitch suppressing component (as components of the absorber force that are to be directed to the respective controls), and controlling the shock absorbers 62 such that the target absorber forces are generated by the respective shock absorbers 62.

b) Vibration Damping Control

In the vibration damping control, the vibration damping component $F_{AV}$ is determined, for damping vibration of the vehicle body 14 by causing each shock absorber 60 to generate the absorber force whose magnitude is dependent on a velocity of the vibration. That is, the vibration damping control is a control based on a so-called skyhook damper theory. Specifically described, the vibration damping component $F_{AV}$ is calculated, based on a sprung-portion absolute velocity $V_S$, i.e., a velocity of a vertical motion of the mount portion of the vehicle body 14 (that is obtained from a sprung-portion vertical acceleration detected by the sprung-portion vertical acceleration sensor 230 provided in the mount portion of the vehicle body 14), in accordance with the following expression:

$$F_{AV} = C_S \cdot V_S (C_S: \text{damping coefficient})$$

c) Roll Suppressing Control

Upon turning of the vehicle, the sprung and unsprung portions located on the side of an inside wheel as one of the right and left wheels $12M_R$, $12M_L$ are displaced away from each other due to a roll moment caused by the turning of the vehicle, while the sprung and unsprung portions located on the side of an outside wheel as the other of the right and left wheels $12M_R$, $12M_L$ are displaced toward each other due to the roll moment. In the roll suppressing control, for restraining the displacements of the sprung and unsprung portions located on the side of the inside wheel away from each other and the displacements of the sprung and unsprung portions located on the side of the outside wheel toward each other, the shock absorber 62 provided for the inside wheel and the shock absorber 62 provided for the outside wheel are caused to generate the respective roll suppressing forces in the form of the absorber force acting in a bound direction and the absorber force acting in a rebound direction, respectively. Specifically described, as the lateral acceleration serving as an index representative of the roll moment caused in the vehicle body 14, an estimated lateral acceleration as an estimated value of the lateral acceleration which would be caused in an assumed case where the vehicle is turned in a response to the steering operation, is employed. That is, the estimated lateral acceleration corresponds to the target lateral acceleration Gy* described above in the description relating to control of the steering devices 34. Then, the roll suppressing component $F_{AR}$ is determined, based on the target lateral acceleration $Gy^*(=K_2 \cdot \{v/(1+Kh \cdot v^2)\} \cdot S_A)$ calculated as described above, in accordance with the following expression:

$$F_{AR}=K_3 \cdot Gy^* (K_3: \text{gain})$$

d) Pitch Suppressing Control

When a nose dive of the vehicle body 14 is caused upon deceleration of the vehicle such as braking of the vehicle, the sprung and unsprung portions located on the side of the front wheel 12F are displaced toward each other due to a pitch moment that causes the nose dive while the sprung and unsprung portions located on the side of the rear wheel 12R are displaced away from each other due to the pitch moment that causes the nose dive. When a squat of the vehicle body 14 is caused upon acceleration of the vehicle, the sprung and unsprung portions located on the side of the front wheel 12F are displaced away from each other due to a pitch moment that causes the squat while the sprung and unsprung portions located on the side of the rear wheel 12R are displaced toward each other due to the pitch moment that causes the squad. In the pitch suppressing control, the absorber forces are generated such that the generated absorber forces cooperate with one another to constitute a pitch suppressing force for suppressing fluctuation of a distance between the sprung and unsprung portions upon generation of the pitch moment. Specifically described, as the longitudinal acceleration serving as an index representative of the pitch moment caused in the vehicle body 14, an estimated longitudinal acceleration as an estimated value of the longitudinal acceleration which would be caused in an assumed case where the vehicle is accelerated or decelerated in a response to the accelerating operation or braking operation, is employed. That is, the estimated longitudinal acceleration corresponds to the target longitudinal acceleration Gx* described above in the description relating to control of the braking and driving devices 22, 42. Then, the pitch suppressing component $F_{AP}$ is determined, based on the target longitudinal acceleration Gx* obtained as described above, in accordance with the following expression:

$$F_{AP}=K_4 \cdot Gx (K_4: \text{gain})$$

e) Determination of Target Controlled Value

Each shock absorber 62 is controlled based on a target absorber force as an absorber force that is to be generated by the shock absorber 62. Described in detail, after the vibration damping component $F_{AV}$, roll suppressing component $F_{AR}$ and pitch suppressing component $F_{AP}$ of the absorber force have been determined, the target absorber forces $F_{A-F}^*, F_{A-R}^*$ of the shock absorbers 62 provided for the front and rear wheels 12F, 12R are determined based on the vibration damping component $F_{AV}$ and the pitch suppressing component $F_{AP}$ in accordance with respective expressions given below, and the target absorber forces $F_{A-ML}^*, F_{A-MR}^*$ of the shock absorbers 62 provided for the left and right wheels 12M$_L$, 12M$_R$ are determined based on the vibration damping component $F_{AV}$ and the roll suppressing component $F_{AR}$ in accordance with respective expressions given below.

$$F_{A-F}^*=F_{AV}+F_{AP}$$

$$F_{A-R}^*=F_{AV}-F_{AP}$$

$$F_{A-ML}^*=F_{AV}-F_{AR}$$

$$F_{A-MR}^*=F_{AV}+F_{AR}$$

v) Controls of Camber Angle and Toe Angle

The camber angle of each of the four wheels 12 and the toe angle of each of the left and right wheels 12M$_L$, 12M$_R$ are not normally changed except for change caused by displacement of the wheel 12 in the bound or rebound direction. That is, each of the electromagnetic motors 74 of the four suspension devices 16, which is provided for a corresponding one of the four wheels 12 and which is configured to change the camber angle of the corresponding wheel 12, is normally held in its neutral position, so as not to cause the shaft portion 70 and the holder portion 72 of the carrier 54 to be rotated relative to each other. Further, each of the electromagnetic motors 80 of the respective suspension devices 16, which is provided for a corresponding one of the left and right wheels 12M$_L$, 12M$_R$ and which is configured to change the toe angle of the corresponding wheel 12, is normally held in its neutral position, so as not to cause the carrier 54 to be pivotable about the king pin shaft.

<Rollover Prevention Control (Motion-Amount Limit Control)> i) Outline of Rollover Prevention Control (Motion-Amount Limit Control)

In the present vehicle, the front portion of the vehicle is provided with only one wheel 12F, so that a distance from the center of gravity of the vehicle (which can be considered to be located in substantially the same position of the center of gravity of the vehicle body during a stationary state of the vehicle) to a straight line interconnecting the front wheel 12F and the left wheel 12M$_L$ and a distance from the center of gravity of the vehicle to a straight line interconnecting the front wheel 12F and the right wheel 12M$_R$ are shorter than a distance from the center of gravity to the left wheel 12M$_L$ (as measured in the width direction of the vehicle) and a distance from the center of gravity to the right wheel 12M$_R$ (as measured in the width direction of the vehicle). Therefore, rollover of the vehicle is easily caused, particularly, in a diagonally forward direction of the vehicle. Specifically, in a state in which the vehicle is being braked and turned, for example, there is a probability that the vehicle is rolled over due to a force that acts on the vehicle body 14 in the diagonally forward direction of the vehicle. In view of this, in the present vehicle motion control system, when the probability of rollover of the vehicle becomes high, the rollover prevention control is executed for preventing the rollover of the vehicle. The rollover prevention control is a control for controlling motion of the vehicle such that a vehicle-body acceleration (as an acceleration of the vehicle body 14) obtained by composing a longitudinal acceleration that is a component of the vehicle-body acceleration in the longitudinal direction of the vehicle and a lateral acceleration that is a component of the vehicle-body acceleration in the width direction of the vehicle, is caused to fall outside a high rollover-probability region (in which it is regarded that the probability of rollover of the vehicle is high) which is defined by a threshold that varies depending on a direction of the vehicle-body acceleration. Specifically described, in the motion-amount limit control, the vehicle-body acceleration G is caused to fall outside the high rollover-probability region, by limiting the turning angle of each of the front and rear wheels 12F, 12R as the steerable wheels and also the total braking force applied to the vehicle. Hereinafter, the motion-amount limit control will be described in detail.

ii) Judgment Regarding Probability of Rollover

Figure 4:
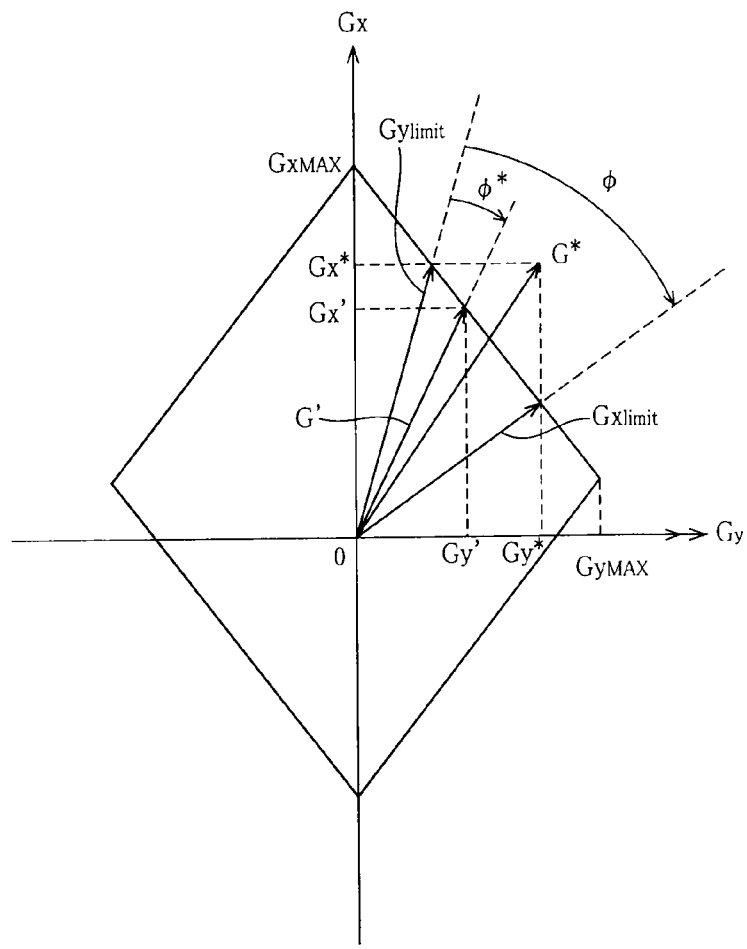
FIG. 4 is a view showing a high rollover-probability region in which a probability of rollover of the vehicle is high, and also a method of determining a target vehicle-body acceleration such that the determined target vehicle-body acceleration falls outside the high rollover-probability region.

The judgment as to whether the probability of rollover of the vehicle is high or not, is made based on a magnitude and a direction of the acceleration of the vehicle body 14. FIG. 4 shows a coordinate plane in which the longitudinal acceleration Gx and the lateral acceleration Gy of the vehicle are represented by respective axes of coordinates. For example, in case of rollover of the vehicle in a forward direction of the vehicle, the rollover would be more easily caused where a height H of the center of gravity is large than where the height H of the center of gravity is small, and would be more easily caused where a distance $L_F$ from the center of gravity to the front wheel 12F is short than where the distance $L_F$ is long. Therefore, a limit value $Gx_{MAX}$ regarding the acceleration in the forward direction of the vehicle can be calculated in accordance with the following expression:

$$Gx_{MAX} = Kx \cdot L_F / H$$

In case of rollover of the vehicle in a width direction of the vehicle, the rollover would be more easily caused where the height H of the center of gravity is large than where the height H of the center of gravity is small, and would be more easily caused where a distance (i.e., half of a tread Tr of the vehicle) from the center of gravity to the left wheel $12M_L$ or right wheel $12M_R$ is short than where the distance is long. Therefore, a limit value $Gy_{MAX}$ regarding the acceleration in the width direction of the vehicle can be calculated in accordance with the following expression:

$$Gy_{MAX} = Ky \cdot (Tr/2) / H$$

Further, a limit value of the vehicle-body acceleration in a diagonally forward direction of the vehicle is determined such that a component of the vehicle-body acceleration in a direction parallel to a straight line which passes the center of gravity of the vehicle body 14 and which is perpendicular to a straight line interconnecting the front wheel 12F and the right wheel $12M_R$, is constant, or such that a component of the vehicle-body acceleration in a direction parallel to a straight line which passes the center of gravity of the vehicle body 14 and which is perpendicular to a straight line interconnecting the front wheel 12F and the left wheel $12M_L$, is constant. That is, the limit value of the vehicle-body acceleration in a diagonally forward direction of the vehicle is represented, on the coordinate plane of FIG. 4, by a straight line which passes a point lying on the coordinate axis of the longitudinal acceleration and representing the longitudinal acceleration limit value $Gx_{MAX}$ and which interconnects the front and right wheels 12F, $12M_R$, or by a straight line which passes the point lying on the coordinate axis of the longitudinal acceleration and representing the longitudinal acceleration limit value $Gx_{MAX}$ and which interconnects the front and left wheels 12F, $12M_L$. That is, as shown in FIG. 4, a threshold line of the high rollover-probability region is defined on the coordinate plane, and the high rollover-probability region is located outside the threshold line on the coordinate plane.

In the present vehicle motion control system, it is judged that the probability of rollover of the vehicle is high when the vehicle-body acceleration (which can be considered as an acceleration vector that can be appreciated in a view as seen from an upper side of the vehicle) composed of (i) an estimated lateral acceleration Gy as an estimated value of the lateral acceleration which would be caused in an assumed case where the vehicle is turned in a response to the steering operation and (ii) an estimated longitudinal acceleration Gx as an estimated value of the longitudinal acceleration which would be caused in an assumed case where the vehicle is accelerated or decelerated in a response to the accelerating operation or braking operation, falls in the high rollover-probability region. The estimated lateral acceleration and estimated longitudinal acceleration correspond to the above-described target lateral acceleration Gy* and target longitudinal acceleration Gx*, respectively. That is, when the target vehicle-body acceleration G* composed of the target lateral acceleration Gy* and target longitudinal acceleration Gx* falls in the high rollover-probability region, namely, when a point defined by cooperation of the target lateral acceleration Gy* and the target longitudinal acceleration Gx* on the coordinate plane falls in the high rollover-probability region, it is judged that the probability of rollover of the vehicle is high.

iii) Limitation Imposed on Target Acceleration

When it is judged that the probability of rollover of the vehicle is high, as described above, the ECU 200 limits the target vehicle-body acceleration G*, by limiting at least one of the target lateral acceleration Gy* and the target longitudinal acceleration Gx*, such that the vehicle-body acceleration falls outside the high rollover-probability region. Thus, in the rollover prevention control which is to be executed in the present control system, at least one of the turning angle of each of the front and rear wheels 12F, 12R and the braking force applied to the vehicle is limited by limiting at least one of the target lateral acceleration Gy* and target longitudinal acceleration Gx*.

In the present control system, it is determined which one of the limitation imposed on the turning amount of each of the front and rear wheels 12F, 12R and the limitation imposed on the braking force applied to the vehicle is to be given a higher priority. For example, in a case where it is necessary to avoid an obstacle that is located in front of the vehicle, it is considered effective to change the direction of the vehicle by carrying out the steering operation rather than by braking the vehicle when the vehicle velocity is high, and it is considered effective to brake the vehicle by carrying out the braking operation rather than changing direction of the vehicle by the steering operation when the vehicle velocity is low. Therefore, in the present control system, the determination as to whether the limitation of the turning angle or the limitation of the braking force is to be given a higher priority, is made based on the vehicle velocity v detected by the vehicle velocity sensor 220.

Figure 5:
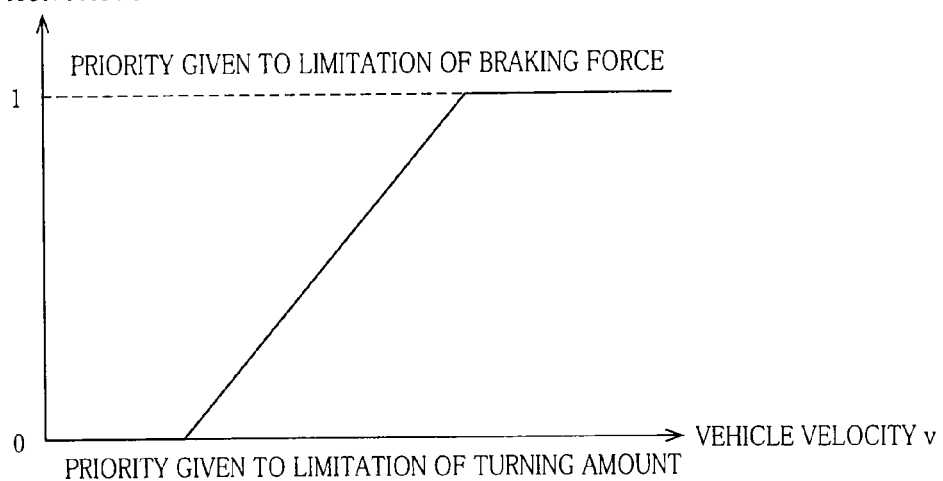
FIG. 5 is a view showing a relationship between a vehicle velocity and a correction factor, which is to be used for determination of the target vehicle-body acceleration.

Referring to FIG. 4, there will be described in detail a method of determining which one of the limitation of the turning angle and the limitation of the braking force is to be given a higher priority. Firstly, a target vehicle-body acceleration Gylimit and a target vehicle-body acceleration Gxlimit are obtained. The target vehicle-body acceleration Gylimit is obtained, by limiting only the lateral acceleration component of the target vehicle-body acceleration G* (composed of the target lateral acceleration Gy* and the target longitudinal acceleration Gx*) such that the obtained target vehicle-body acceleration Gylimit falls outside the high rollover-probability region. The target vehicle-body acceleration Gxlimit is obtained, by limiting only the longitudinal acceleration component of the target vehicle-body acceleration G* such that the obtained target vehicle-body acceleration Gxlimit falls outside the high rollover-probability region. Then, a direction of a limited vehicle-body acceleration G' as a determined target acceleration is determined such that the determined direction of the limited vehicle-body acceleration G' is intermediate between a direction of the above-described target vehicle-body acceleration Gylimit and a direction of the above-described target vehicle-body acceleration Gxlimit, because it is preferable that the limited vehicle-body acceleration G' as the determined target acceleration is located between the two target vehicle-body accelerations Gylimit, Gxlimit. Specifically described, a changeable angle 4) as an angle defined between the two target vehicle-body accelerations Gylimit, Gxlimit is obtained, and then an angle φ' of the limited vehicle-body acceleration G' with respect to the vehicle-body acceleration Gylimit is obtained by multiplying the changeable angle φ' with a correction factor k (0≤k≤1) that is determined depending on the vehicle velocity v. It is noted that the correction factor k is determined with reference to a stored map data, as shown in FIG. 5, which is indicative of a relationship between the correction factor k and the vehicle velocity v as a parameter of the correction factor k. The correction factor k is a value that is variable such that a higher priority is given to the limitation imposed on the turning angle when the vehicle velocity is low and such that a higher priority is given to the limitation imposed on the braking force when the vehicle velocity is high.

Next, a magnitude of the limited vehicle-body acceleration G' as the determined target acceleration is determined such that the determined magnitude of the limited vehicle-body acceleration G' corresponds to a maximum value falling outside the high rollover-probability region while the limited vehicle-body acceleration G' has the direction determined as described above. That is, the magnitude of the limited vehicle-body acceleration G' is determined such that the limited vehicle-body acceleration G' is represented by a straight line extending up to the threshold defining the high rollover-probability region. Then, a longitudinal component Gx' of the limited vehicle-body acceleration G', which is parallel to the longitudinal direction of the vehicle, is treated as the target longitudinal acceleration, based on which the total braking force applied to the vehicle is to be controlled. A lateral component Gy' of the limited vehicle-body acceleration G', which is parallel to the lateral direction of the vehicle, is treated as the target lateral acceleration, based on which the turning angle of each of the front and rear wheels 12F, 12R is to be controlled. Thus, the turning angle of each of the front and rear wheels 12F, 12R and the braking force applied to the vehicle are controlled in accordance with the above-described manners, such that the turning angle of each of the front and rear wheels 12F, 12R is controlled based on the lateral component Gy' of the limited vehicle-body acceleration G', and such that the braking force applied to the vehicle is controlled based on the longitudinal component Gx' of the limited vehicle-body acceleration G'. Therefore, by limiting the turning angle of each of the front and rear wheels 12F, 12R and/or the total braking force applied to the vehicle are or is controlled, the vehicle-body acceleration, which is caused by the tuning of each steerable wheel and application of the braking force to the vehicle, can be caused to fall outside the high rollover-probability region, whereby rollover of the vehicle is prevented.

<Control Programs>

Figure 6:
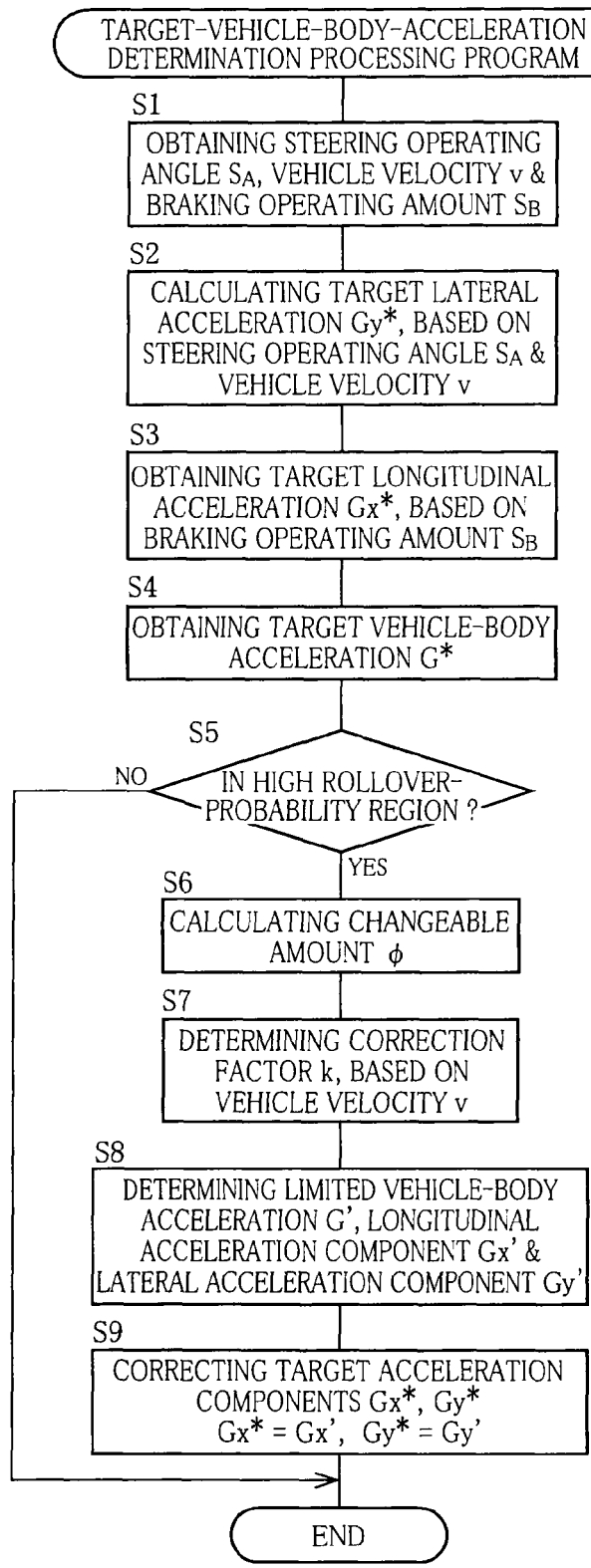
FIG. 6 is a flow chart representing a target-vehicle-body-acceleration determination processing program that is to be executed by an electronic control unit shown in FIG. 1.
Figure 7:
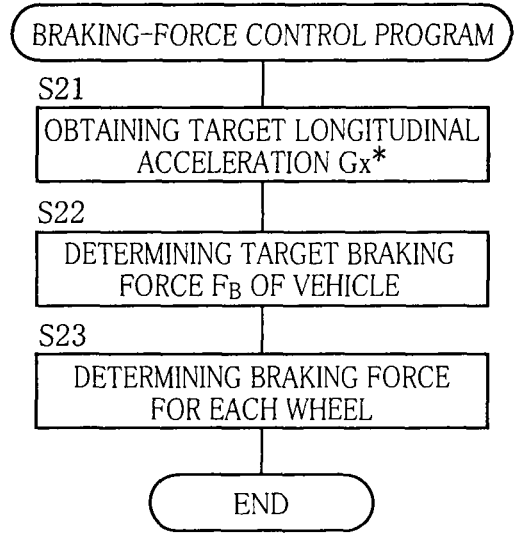
FIG. 7 is a flow chart representing a braking-force control program that is to be executed by the electronic control unit shown in FIG. 1.
Figure 8:
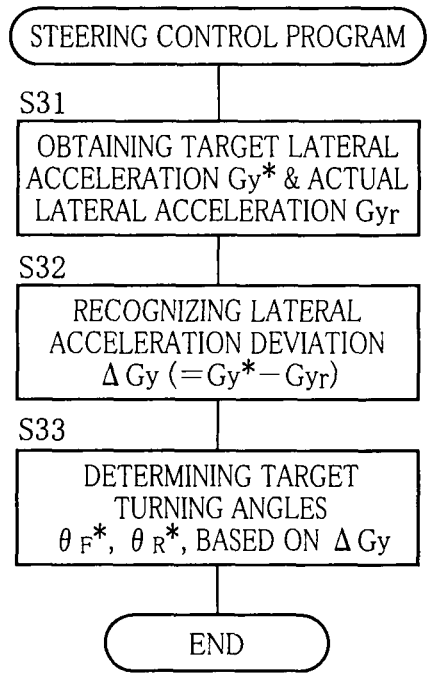
FIG. 8 is a flow chart representing a steering control program that is to be executed by the electronic control unit shown in FIG. 1.

The motion of the vehicle is controlled by executions of a target-vehicle-body-acceleration determination processing program represented by flow chart of FIG. 6 and programs for controlling the braking devices 22, steering device 34, driving devices 42 and shock absorbers 62 as described above. Each of these programs is repeatedly executed by the ECU 200, at a short time interval (e.g., several milliseconds) while an ignition switch of the vehicle is placed in its ON state. Hereinafter, only controls of the braking devices 22 and the steering devices 34 relating to the above-described prevention of rollover of the vehicle will be described. The braking devices 22 are controlled by execution of a braking-force control program represented by flow chart of FIG. 7, while the steering devices 34 are controlled by execution of a steering control program represented by flow chart of FIG. 8. With reference to the flow charts of FIGS. 6, 7 and 8, there will be briefly described procedures carried out in executions of these programs.

In the target-vehicle-body-acceleration determination processing program, step S1 (hereinafter abbreviated as "S1" as well as the other steps) is implemented to obtain the steering operating angle $S_A$, vehicle velocity v and braking operating amount $S_B$. Next, in S2 and S3, the target lateral acceleration Gy* is calculated based on the steering operating angle $S_A$ and vehicle velocity v, and the target longitudinal acceleration Gx* is obtained based on the braking operating amount $S_B$. Then, in S4, the target vehicle-body acceleration G* is obtained by composing the target lateral acceleration Gy* and the target longitudinal acceleration Gx*. In S5, it is judged whether or not the target vehicle-body acceleration G* falls in the high rollover-probability region. When the target vehicle-body acceleration G* falls outside the high rollover-probability region, S6 and steps following S6 are skipped without their implementations.

When the target vehicle-body acceleration G* falls in the high rollover-probability region, S6-S8 are implemented to determine the limited vehicle-body acceleration G', as described above, such that the limited vehicle-body acceleration G' falls outside the high rollover-probability region. Then, in S9, the target longitudinal acceleration Gx* and the target lateral acceleration Gy* are corrected from the respective values determined in S3 and S4, to the respective longitudinal acceleration component Gx' and lateral acceleration component Gy' of the limited vehicle-body acceleration G'. One cycle of execution of the target-vehicle-body-acceleration determination processing program is completed when the above-described series of procedures have been done.

In the braking-force control program, the target braking force $F_B$, which is to be applied to the vehicle, is determined based on the target longitudinal acceleration Gx* determined in the target-vehicle-body-acceleration determination processing program. Further, in the steering control program, the target turning angles $\theta_F^*$, $\theta_R^*$ of the respective front and rear wheels 12F, 12R are determined based on the target lateral acceleration Gy* determined in the target-vehicle-body-acceleration determination processing program and also the actual lateral acceleration Gyr detected by the lateral acceleration sensor 228. That is, when the probability of rollover of the vehicle is made high in execution of a normal control, the target vehicle-body acceleration is set to the vehicle-body acceleration G' that is limited to fall outside the high rollover-probability region, whereby the target braking force $F_B$ subjected to the braking force control and/or the target turning angles $\theta_F^*$, $\theta_R^*$ subjected to the steering control are or is limited.

<Functional Construction of ECU>

Figure 9:
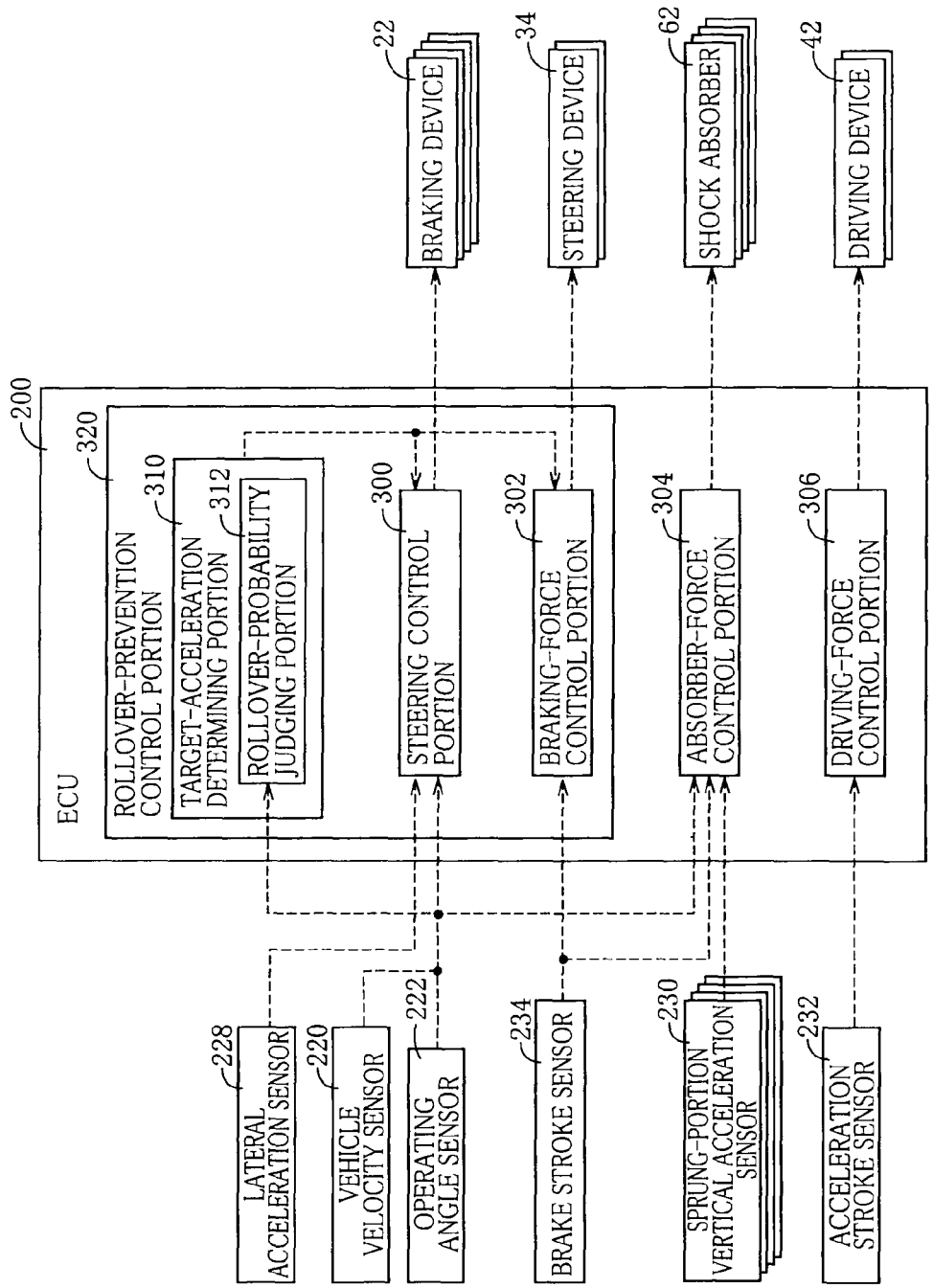
FIG. 9 is a block diagram showing functions of the electronic control unit serving as a control device of the vehicle motion control system according to the first embodiment of the claimable invention.

The ECU 200, which functions as a control device configured to control motion of the vehicle by executing the above-described controls, can be considered to have various functional portions for carrying out the above-described procedures. Described in detail, as shown in FIG. 9, the ECU 200 includes a steering control portion 300, a braking-force control portion 302, a absorber-force control portion 304 and a driving-force control portion 306. The steering control portion 300 is a functional portion configured to control turning of each of the front and rear wheels 12F, 12R by executing the steering control program. The braking-force control portion 302 is a functional portion configured to control the braking forces applied to the respective four wheels 12. The absorber-force control portion 304 is a functional portion configured to control the absorber forces generated by the respective shock absorbers 62 provided for the respective four wheels 12. The driving-force control portion 306 is a functional portion configured to control the driving forces given to the respective left and right wheels $12M_L$, $12M_R$. The ECU 200 further includes a target vehicle-body-acceleration determining portion 310 configured to determine the target vehicle-body acceleration as the vehicle-body acceleration of the vehicle body 14 that is to be caused. The target-acceleration determining portion 310 includes a rollover-probability judging portion 312 configured to judge whether the probability of rollover of the vehicle is high or not, by seeing if the vehicle-body acceleration falls in the high rollover-probability region or not. The target-acceleration determining portion 310 is configured to determine the target vehicle-body acceleration, such that the target vehicle-body acceleration is set to the limited target vehicle-body acceleration that is limited to fall outside the high rollover-probability region, when it is judged by the rollover-probability judging portion 312 that the probability of rollover of the vehicle is high. The steering control portion 300 is configured to control turning of each of the front and rear wheels 12F, 12R, based on the lateral acceleration component of the limited target vehicle-body acceleration which is parallel to the vehicle width direction. The braking-force control portion 302 is configured to control the braking force, based on the longitudinal acceleration component of the limited target vehicle-body acceleration which is parallel to the vehicle longitudinal direction. That is, a rollover-prevention control executing portion 320 is constituted by portions of the target-acceleration determining portion 310 which are assigned to implement S6 through S9 of the target-vehicle-body-acceleration determination processing program and also the steering control portion 300 and the braking-force control portion 302 which are configured to control the wheel turning and the braking force, based on the limited target vehicle-body acceleration that is limited to fall outside the high rollover-probability region.

<Modification>

Hereinafter, there will be described a modification of the above-described first embodiment. Like in the above-described first embodiment, in this modification, too, the rollover of the vehicle is prevented by limiting the turning angle of each of the front and rear wheels 12F, 12R and/or the braking force applied to the vehicle. In the above-described embodiment, a higher priority is given to a selected one of the limitation imposed on the turning angle of each of the front and rear wheels 12F, 12R and the limitation imposed on the braking force applied to the vehicle, which is selected based on the running velocity v of the vehicle. In this modification, the above-described selected one, to which the higher priority is to be given, is selected based on a velocity of the steering operation and/or a velocity of the braking operation. For example, regarding the steering operation velocity, it is preferable that the braking force applied to the vehicle is limited so as to give a higher priority to the turning of each of the front and rear wheels 12F, 12R by the steering operation, when the steering operation is carried out at a high velocity, for increasing a turning angle of the steering wheel 30. On the other hand, regarding the braking operation velocity, it is preferable that the turning angle of each of the front and rear wheels 12F, 12R is limited so as to give a higher priority to the braking of the vehicle by the braking operation, when the braking operation is carried out at a high velocity, for depressing the brake pedal 20. Hereinafter, there will be specifically described a method of determining which one of the turning angle and the braking force is to be more limited.

First, like in the above-described first embodiment, the changeable angle φ of the target acceleration, which is shown in FIG. 4, is obtained. Then, the correction factor k, which is used upon determination of the direction of the limited vehicle-body acceleration G', is determined based on the steering operation velocity $d|S_A|/dt$ (hereinafter represented by $|S_A|'$ where appropriate) and the braking operation velocity $dS_B/dt$ (hereinafter represented by $S_B'$ where appropriate). When the correction factor k is to be determined, an operation velocity ratio $r_s$ (i.e., a ratio of the braking operation velocity $S_B'$ to the steering operation velocity $|S_A|'$, more specifically, a ratio of velocity $S_B'$ of depressing of the brake pedal 20 to a velocity $|SA|$ of the turning of the steering wheel 30 in such a direction that increases the wheel turning angle) is obtained. The operation velocity ratio $r_S$ can be represented by a point on a coordinate plane of FIG. 10 in which the steering operation velocity $|SA|'$ and the braking operation velocity $S_B'$ are represented by respective axes of coordinates. Further, a standard ratio $r_0$ as a standard value of the operation velocity ratio is represented by a straight line in FIG. 10. The straight line representing the standard operation velocity ratio $r_0$ cooperates with a straight line interconnecting a coordinate origin O and the point representing the operation velocity ratio $r_S$ to define an angle α (that is a counterclockwise angle from the straight line representing the standard operation velocity ratio $r_0$). As shown in FIG. 11, the correction factor k is determined based on the angle α, and is calculated in accordance with an expression given below.

$$k=(1-\sin α)/2=[1-\sin \{\tan^{-1}(S_B'/|S_A|')-45°\}]/2$$

Figure 10:
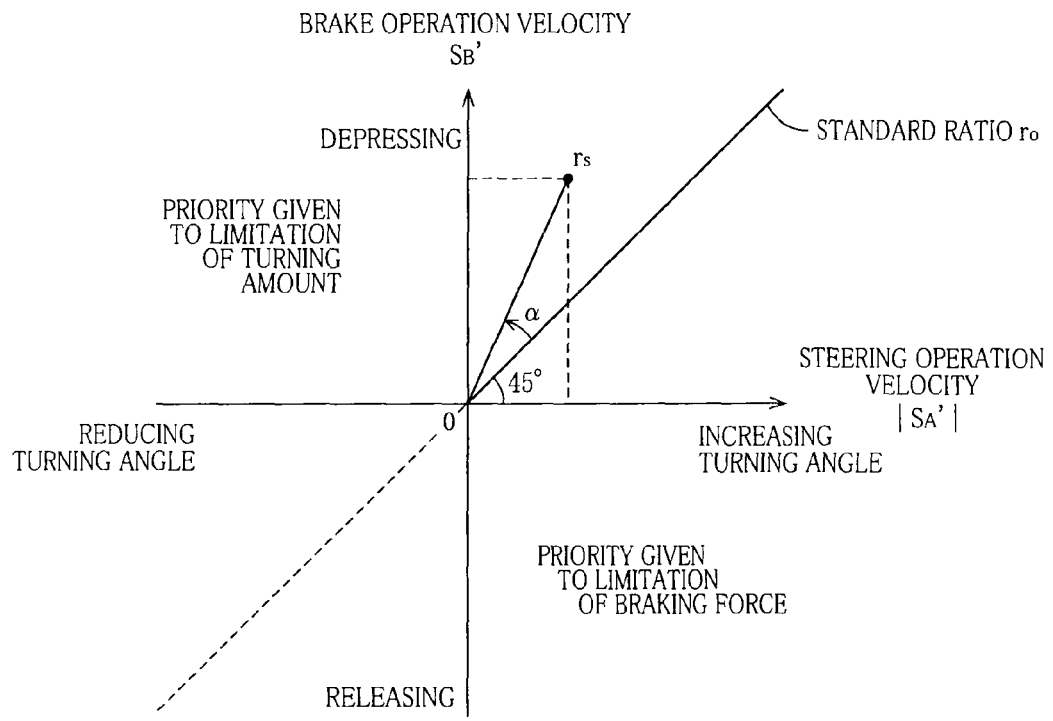
FIG. 10 is a view showing an operation velocity ratio between a braking operation velocity and a steering operation velocity, which is to be used in a vehicle motion control system according to a modification of the first embodiment.
Figure 11:
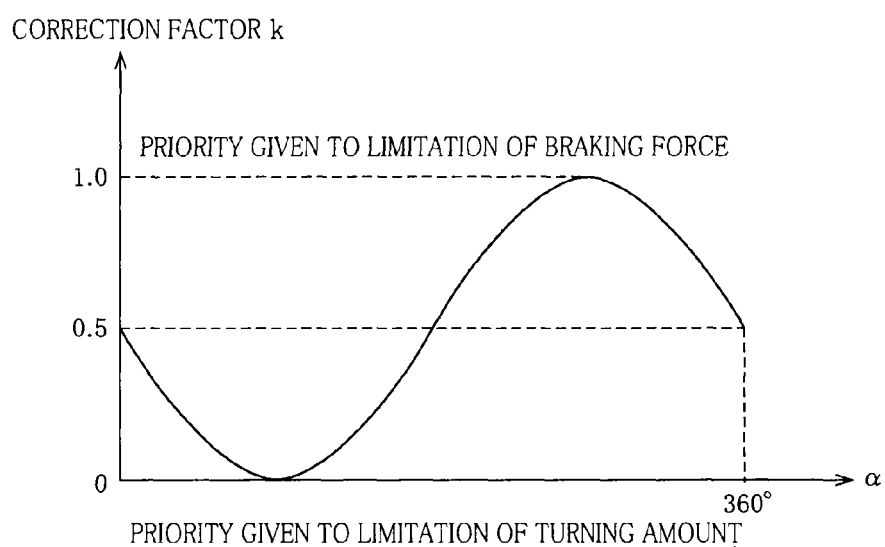
FIG. 11 is a view showing a relationship between the operation velocity ratio and a correction factor, which is to be used for determination of the target vehicle-body acceleration in the vehicle motion control system according to the modification.

Therefore, as is understood from FIGS. 10 and 11, an increase of the operation velocity ratio $r_S$ leads to a higher priority given to the limitation imposed on the turning angle, and a reduction of the operation velocity ratio $r_S$ leads to a higher priority given to the limitation imposed on the braking force.

In this modification, one of the turning amount and the braking force, which corresponds to one of the steering operation and the braking operation that is regarded more important by the vehicle operator, is less limited. Thus, it is possible to prevent rollover of the vehicle while reducing discomfort given to the vehicle operator.

[Embodiment 2]

In the vehicle motion control system according to the above-described first embodiment, rollover of the vehicle is prevented by limiting the turning amount of the steerable wheel and/or the braking force applied to the vehicle. On the other hand, in this second embodiment, the rollover of the vehicle is prevented by inclining or tilting the vehicle body such that the center of gravity of the vehicle body 14 is displaced in a plan view of the vehicle. It is noted that the vehicle motion control system according to the second embodiment is substantially identical with the control system according to the first embodiment except for the rollover prevention control executed by the ECU 200. Therefore, the same reference signs as used in the control system of the first embodiment will be used to identify the corresponding elements which will not be described or will be described in a simplified manner.

Figure 12:
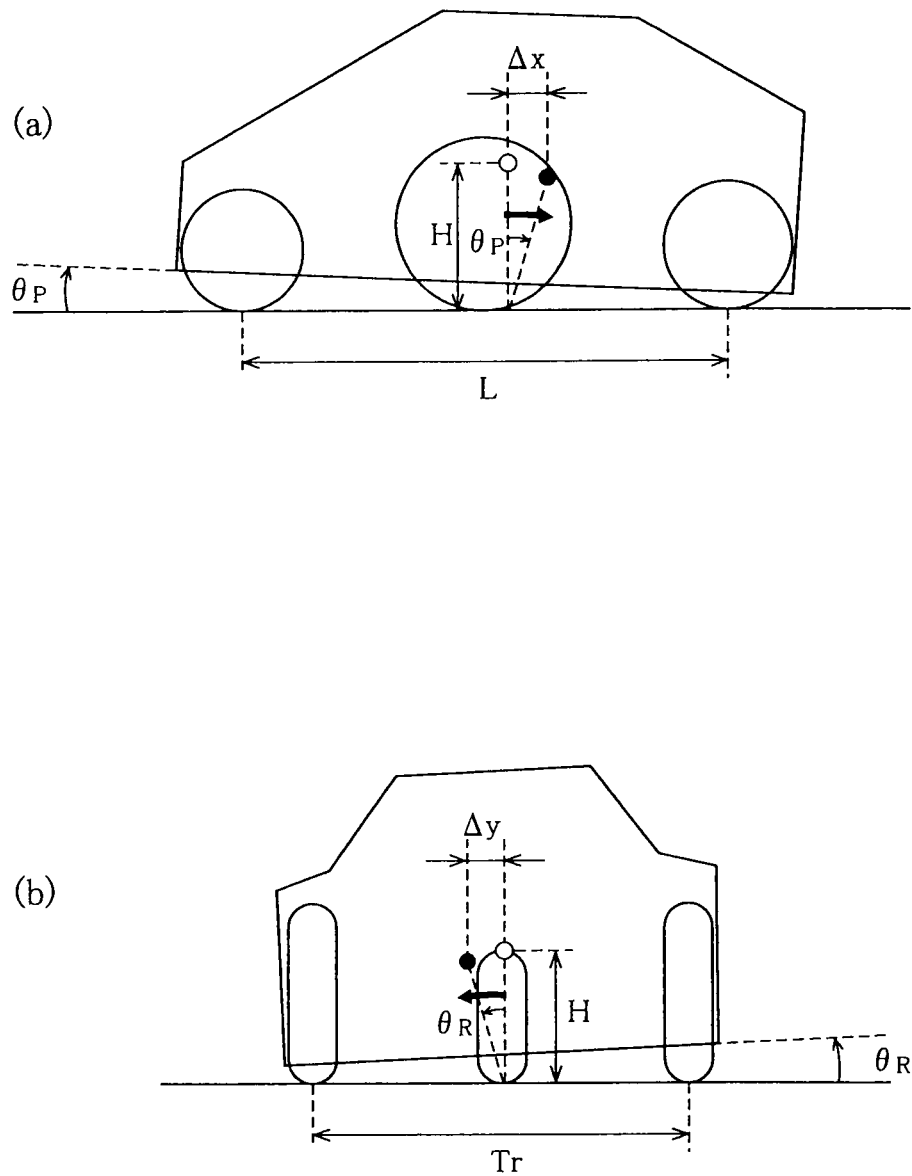
FIG. 12 is a set of views showing an outline of a vehicle-body tilt control as a rollover prevention control, which is to be executed in a vehicle motion control system according to a second embodiment of the claimable invention, wherein the view (a) is a side view and the view (b) is a view as seen from a rear side of the vehicle.

Described in detail, the rollover prevention control in the control system according to this second embodiment is a control in which the center of gravity of the vehicle body 14 is shifted away from the straight line interconnecting the front wheel 12F and the right wheel $12M_R$ where there is a high probability that rollover of the vehicle would be caused in a right-forward direction, and in which the center of gravity of the vehicle body 14 is shifted away from the straight line interconnecting the front wheel 12F and the left wheel $12M_L$ where there is a high probability that rollover of the vehicle would be caused in a left-forward direction. It is noted that the vehicle body 14 is tilted by causing each of the shock absorbers 62 provided for the respective four wheels 12, to change a distance between the vehicle body 14 and a corresponding one of the wheels 12. FIG. 12 is a set of views schematically showing a state in which, when the probability of rollover of the vehicle in a right-forward direction becomes high, the center of gravity of the vehicle body 14 is shifted by the vehicle-body tilt control such that the vehicle body 14 is tiled in a left-backward direction. FIG. 12 (a) is a side view of the vehicle, while FIG. 12 (b) is a view as seen from a rear side of the vehicle. The vehicle-body tilt control will be described specifically.

Figure 13:
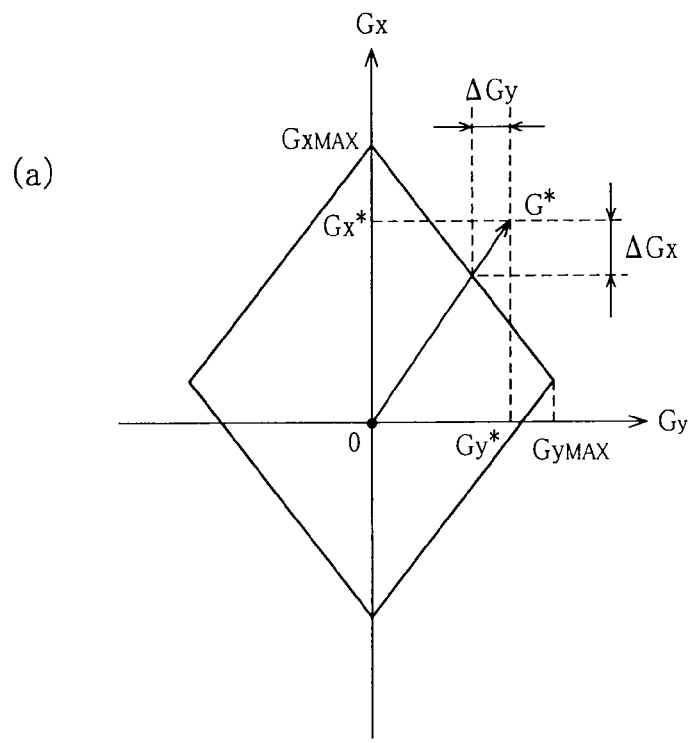
FIG. 13 is a set of views showing a method of determining a direction in which a center of gravity of the vehicle body is to be shifted and a distance by which the center of gravity is to be shifted, such that the vehicle-body acceleration falls outside the high rollover-probability region.
Figure 13:
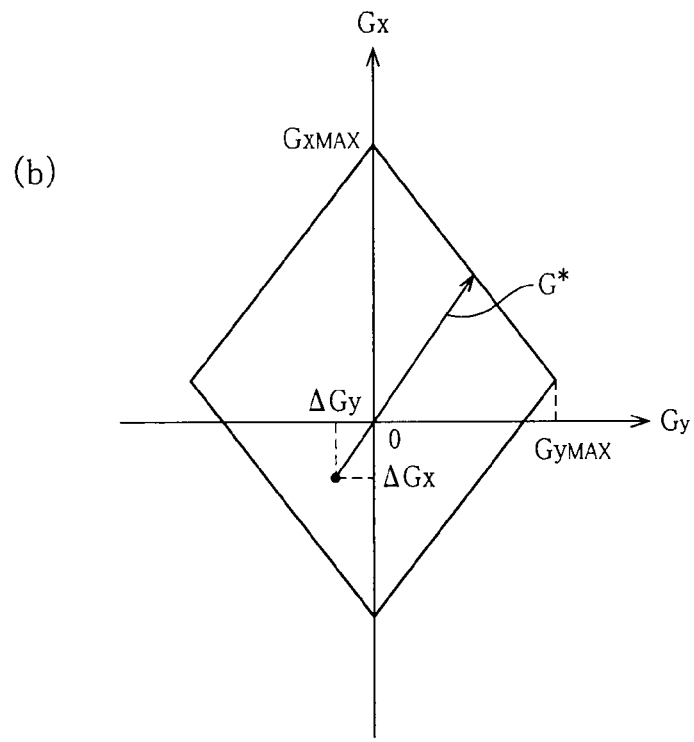

First, like in the control system according to the above-described first embodiment, the target lateral acceleration Gy* is calculated based on the steering operating angle $S_A$ and the vehicle velocity v while the target longitudinal acceleration Gx* is obtained based on the braking operating amount $S_B$, and it is judged whether or not there is a probability of rollover of the vehicle, depending on whether or not the target vehicle-body acceleration G* composed of the target lateral acceleration Gy* and the target longitudinal acceleration Gx* falls in the high rollover-probability region. Then, when the target vehicle-body acceleration G* falls in the high rollover-probability region, as shown in FIG. 13 (a), the rollover prevention control is executed. In the rollover prevention control, the center of gravity of the vehicle body 14 is shifted in a direction opposite to the direction of the target vehicle-body acceleration G* such that the sifted target vehicle-body acceleration G* falls outside the high rollover-probability region (that is determined based on the center of gravity), as shown in FIG. 13 (b). An amount, by which the center of gravity is to be shifted, is determined based on an amount by which the target vehicle-body acceleration G* exceeds the threshold of the high rollover-probability region. Described in detail, an amount ΔGx by which the target vehicle-body acceleration G* exceeds the threshold in the longitudinal direction of the vehicle and also an amount ΔGy by which the target vehicle-body acceleration G* exceeds the threshold in the width direction of the vehicle are first obtained, and then target shift amounts Δx, Δy are calculated based on the amounts ΔGx, ΔGy in accordance with expressions given below. The target shift amount Δx is an amount by which the center of gravity is to be shifted in the longitudinal direction of the vehicle, while the target shift amount Δy is an amount by which the center of gravity is to be shifted in the width direction of the vehicle.

$$\Delta x = -\Delta Gx \cdot H/Kx$$

$$\Delta y = -\Delta Gy \cdot H/Ky$$

Then, the shock absorbers 62 provided for the front and rear wheels 12F, 12R are controlled so as to cause the center of gravity of the vehicle body 14 to be shifted in the longitudinal direction of the vehicle, while the shock absorbers 62 provided for the left and right wheels $12M_L$, $12M_R$ are controlled so as to cause the center of gravity to be shifted in the width direction of the vehicle.

For example, when the center of gravity is to be shifted in a backward direction of the vehicle as shown in FIG. 12 (a), the shock absorbers 62 provided for the front and rear wheels 12F, 12R are controlled such that a wheel-body distance between the front wheel 12F and the vehicle body 14 becomes larger than a wheel-body distance between the rear wheel 12R and the vehicle body 14. A difference $\Delta z_{F-R}$ between the wheel-body distance on the side of the front wheel 12F and the wheel-body distance on the side of the rear wheel 12R can be expressed by the below expression using a wheel base L and a tilt angle $\theta_P$ of the vehicle body 14 in the longitudinal direction.

$$\Delta z_{F-R} = L \cdot \sin \theta_P$$

"sin $\theta_P$" in the above expression can be expressed by the below expression using the target shift amount Δx in the longitudinal direction.

$$\sin \theta_P = \Delta x/H$$

From the above two expressions, the below expression can be obtained.

$$\Delta z_{F-R} = L \cdot \Delta x/H$$

Thus, a wheel-body distance change amount $\Delta z_{F-R}$, by which the wheel-body distance is to be changed, is determined based on the target shift amount Δx that has been obtained as described above. Then, the ECU 200 causes the shock absorber 62F provided for the front wheel 12F, to generate an absorber force that increases the wheel-body distance by $\Delta z_{F-R}/2$, and causes the shock absorber 62R provided for the rear wheel 12R, to generate an absorber force that reduces the wheel-body distance by $\Delta z_{F-R}/2$. Specifically described, a distance changing component $F_{AZ}x$ as a component of the absorber force generated by each of the shock absorbers 62F, 62R provided for the respective front and rear wheels 12F, 12R, is determined based on the half ($\Delta z_F$-R/2) of the wheel-body distance change amount AZF-R in accordance with expression given below.

$$F_{AZ}x = K_5 \cdot \Delta z_{F-R}/2 (K_5: \text{gain})$$

Then, the target absorber forces $F_{A-F}*$, $F_{A-R}*$ of the shock absorbers 62 provided for the front and rear wheels 12F, 12R are determined based on the distance changing component $F_{AZ}x$ and also the above-described vibration damping component $F_{AV}$ and pitch suppressing component $F_{AP}$, in accordance with expressions given below.

$$F_{A-F}* = F_{AV} + F_{AP} + F_{AZ}x$$

$$F_{A-R}* = F_{AV} - F_{AP} - F_{AZ}x$$

For example, when the center of gravity is to be shifted in a leftward direction of the vehicle as shown in FIG. 12 (b), the shock absorbers 62 provided for the left and right wheels $12M_L$, $12M_R$ are controlled such that a wheel-body distance between the right wheel $12M_R$ and the vehicle body 14 becomes larger than a wheel-body distance between the left wheel $12M_L$ and the vehicle body 14. A difference $\Delta_{ZLR}$ between the wheel-body distance on the side of the left wheel $12M_L$ and the wheel-body distance on the side of the right wheel $12M_R$ can be expressed by the below expression using a tread Tr and a tilt angle $\theta_R$ of the vehicle body 14 in the width direction of the vehicle.

$$\Delta z_{LR} = Tr \cdot \sin \theta_R$$

"sin $\theta_R$" in the above expression can be expressed by the below expression using the target shift amount Δy in the width direction.

$$\sin \theta_R = \Delta y/H$$

From the above two expressions, the below expression can be obtained.

$$\Delta Z_{LR} = Tr \cdot \Delta y/H$$

Thus, a wheel-body distance change amount $\Delta Z_{LR}$, by which the wheel-body distance is to be changed, is determined based on the target shift amount Δy that has been obtained as described above. Then, the ECU 200 causes the shock absorber $62M_R$ provided for the right wheel $12M_R$, to generate an absorber force that increases the wheel-body distance by $\Delta Z_{LR}/2$, and causes the shock absorber $62M_L$ provided for the left wheel $12M_L$, to generate an absorber force that reduces the wheel-body distance by $\Delta Z_L/2$. Specifically described, a distance changing component $F_{Az}y$ as a component of the absorber force generated by each of the shock absorbers $62M_L$, $62M_R$ provided for the respective left and right wheels $12M_L$, $12M_R$, is determined based on the half ($\Delta z_{LR}/2$) of the wheel-body distance change amount $\Delta Z_{LR}$ in accordance with expression given below.

$$F_{AZ}Y = K_6 \cdot \Delta z_{LR}/2 (K_6: \text{gain})$$

Then, the target absorber forces $F_{A-ML}{}^*$, $F_{A-MR}{}^*$ of the shock absorbers 62 provided for the left and right wheels $12M_L$, $12M_R$ are determined based on the distance changing component $F_{AZ}y$ and also the above-described vibration damping component $F_{AV}$ and roll suppressing component $F_{AR}$, in accordance with expressions given below.

$$F_{A-ML}{}^* = F_{AV} + F_{AR} + F_{AZ}Y$$

$$F_{A-MR}{}^* = F_{AV} - F_{AR} - F_{AZ}Y$$

Then, activations of the electromagnetic motors 64 are controlled by respective inverters, for generating the target absorber forces F* that have been described above. Described in detail, the inverters receive commands relating to duty ratios that are determined based on the target absorbers forces $F_{A-F}{}^*$, $F_{A-R}{}^*$, $F_{A-ML}{}^*$, $F_{A-MR}{}^*$ of the respective four shock absorbers 62, so that the activations of the motors 64 are controlled, by the respective inverters, based on the commands transmitted to the inverters.

Figure 14:
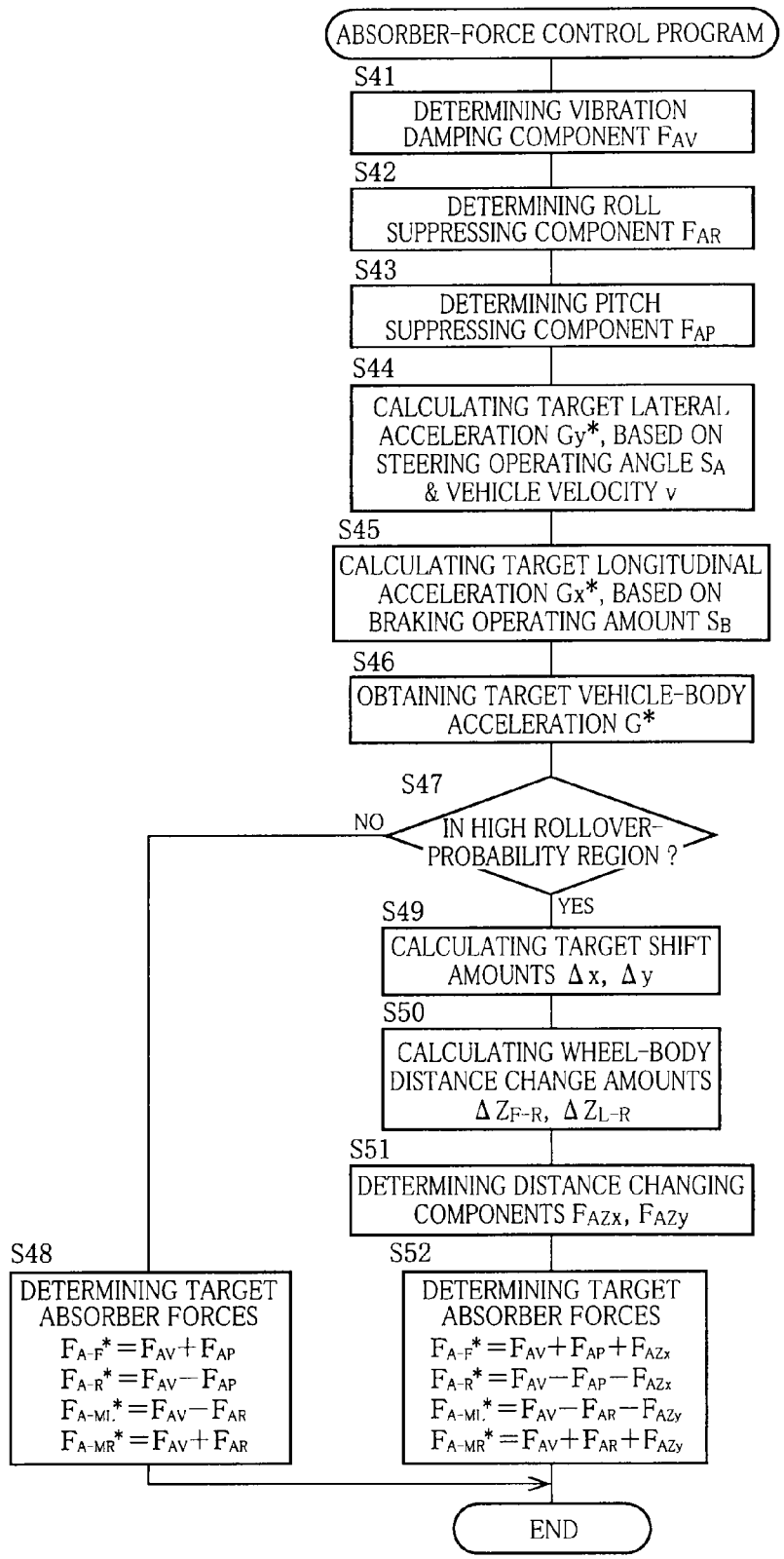
FIG. 14 is a flow chart representing an absorber-force control program that is to be executed by an electronic control unit provided in the vehicle motion control system according to the second embodiment.

The above-described control of motion of the vehicle is carried out by execution of an absorber-force control program shown by flow chart of FIG. 14. The absorber-force control program is repeatedly executed by the ECU 200, at a short time interval (e.g., several milliseconds) while the ignition switch of the vehicle is placed in its ON state. With reference to the flow chart of FIG. 14, there will be briefly described procedures carried out in execution of the program.

In the absorber-force control program, the vibration damping component $F_{AV}$, roll suppressing component $F_{AR}$ and pitch suppressing component $F_{AP}$ are first determined in accordance with the above-described methods in S41 through S43. Next, in S44 through S46, the target vehicle-body acceleration G* is obtained in accordance with substantially the same method as in the control system of the first embodiment. Then, in S47, it is judged whether or not the vehicle-body acceleration G* falls in the high rollover-probability region. When the target vehicle-body acceleration G* falls outside the high rollover-probability region, the control flow goes to S48 in which the target absorber forces $F_A$* of the respective four shock absorbers 62 provided for the respective four wheels 12 are determined based on the vibration damping component $F_V$, roll suppressing component $F_R$ and pitch suppressing component $F_P$. When the target vehicle-body acceleration G* falls in the high rollover-probability region, S49-S51 are implemented to determine, in accordance with the above-described methods, the distance changing components $F_{AZ}x$, $F_{AZ}y$ as the components of the absorber force which are required to tilt the vehicle body 14 and shift the center of gravity of the vehicle body, for preventing rollover of the vehicle. Then, in S52, the target absorber forces $F_A$* are determined by using the distance changing components $F_{AZ}x$, $F_{AZ}y$ in addition to the vibration damping component $F_V$, roll suppressing component $F_R$ and pitch suppressing component $F_P$. One cycle of execution of the absorber-force control program is completed when the above-described series of procedures have been done.

In the control system according to the present second embodiment, the vehicle-body tilt control is executed in place of execution of the motion-amount limit control that is executed in the control system according to the first embodiment. However, the vehicle-body tilt control may be executed in addition to execution of the motion-amount limit control.

[Embodiment 3]

In the vehicle motion control system according to this third embodiment, rollover of the vehicle is prevented by increasing an understeering tendency of the vehicle. It is noted that the vehicle motion control system according to the third embodiment is substantially identical with the control system according to the first embodiment except for the rollover prevention control executed by the ECU 200. Therefore, the same reference signs as used in the control system of the first embodiment will be used to identify the corresponding elements which will not be described or will be described in a simplified manner.

Figure 15:
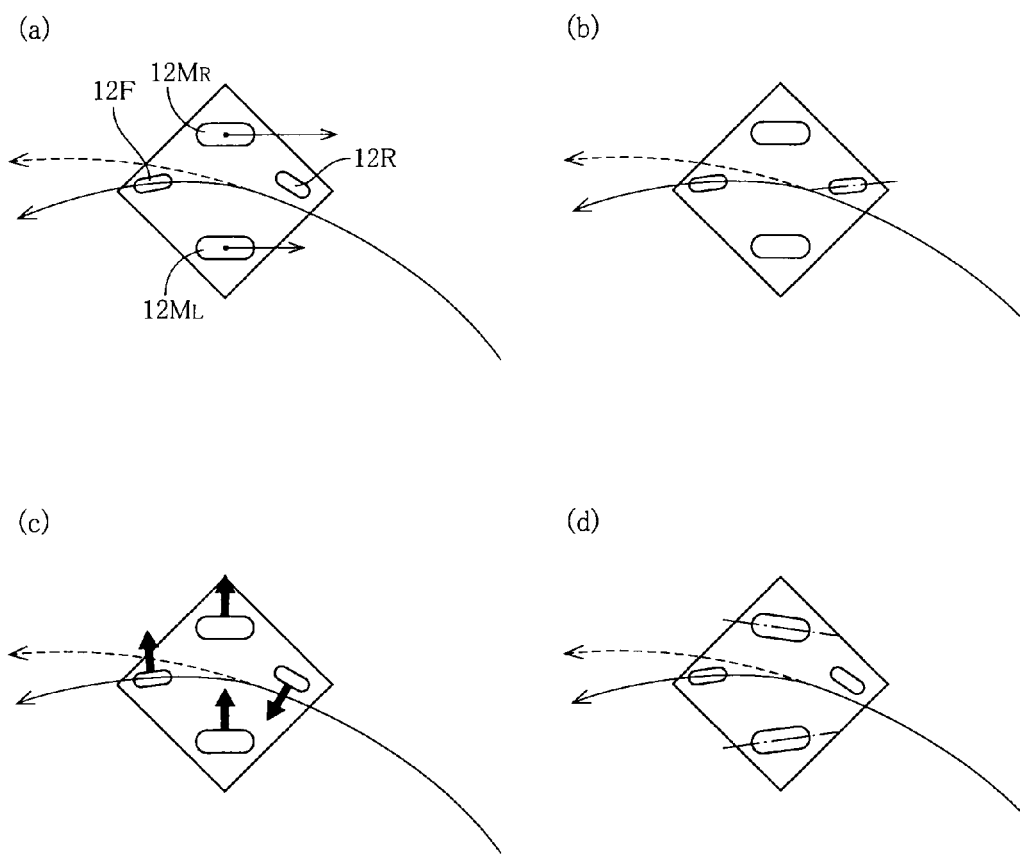
FIG. 15 is a set of views showing an outline of a steering-characteristic changing control as the rollover prevention control, which is to be executed in a vehicle motion control system according to a third embodiment of the claimable invention.

In the control system of the third embodiment, a steering-characteristic changing control as the rollover prevention control is executed. In the steering-characteristic changing control, at least one of four controls for enhancing the understeering tendency is selected based on, for example, a running condition of the vehicle, and the selected one or ones of the four controls is or are executed. The four controls will be described one by one. A first one of the controls is a braking-force difference establishing control executed, upon turning of the vehicle, to cause the braking force applied to an outside wheel as one of the left and right wheels $12M_L$, $12M_R$, to be larger than the braking force applied to an inside wheel as the other of the left and right wheels $12M_L$, $12M_R$, as shown in FIG. 15 (a). In this braking-force difference establishing control, the total braking force, which is distributed evenly to the left and right wheels $12M_L$, $12M_R$ in a normal control, is distributed unevenly to the left and right wheels $12M_L$, $12M_R$ by changing a ratio of distribution of the total braking force, whereby a braking force difference is established between the left and right wheels $12M_L$, $12M_R$. Specifically, from a point of time at which it is judged that the probability of rollover of the vehicle is high, the braking force applied to the outside wheel is gradually increased with elapse of time while the braking force applied to the inside wheel is gradually reduced with elapse of time. A second one of the controls is an in-phase steering control for causing the rear wheel 12R to be steered in-phase with the front wheel 12F, as shown in FIG. 15 (b). In this in-phase steering control, when it is judged that the probability of rollover of the vehicle is high, the target turning angle $\theta_R$* of the rear wheel 12R is set to the same value of the target turning angle $\theta_F$* of the rear wheel 12F.

A third one of the controls is a camber-angle changing control for changing a camber angle of each of the four wheels 12, as shown in FIG. 15 (c). In this camber-angle changing control, the electromagnetic motor 74 provided for each of the front, left and right wheels 12F, $12M_L$, $12M_R$ is controlled for changing the camber angle of each of the front, left and right wheels 12F, $12M_L$, $12M_R$ such that an upper portion of each of the front, left and right wheels 12F, $12M_L$, $12M_R$ is inclined by a given degree in a direction away from a center of turning of the vehicle, while the electromagnetic motor 74 provided for the rear wheel 12R is controlled for changing the camber angle of rear wheel 12R such that an upper portion of the rear wheel 12R is inclined by a given degree in a direction toward the center of turning of the vehicle. A fourth one of the controls is a toe-angle changing control for changing a toe angle of each of the left and right wheels $12M_L$, $12M_R$, as shown in FIG. 15 (d). In this toe-angle changing control, the electromagnetic motor 80 provided for each of the left and right wheels $12M_L$, $12M_R$ is controlled for changing the toe angle of each of the left and right wheels $12M_L$, $12M_R$ by a given degree such that rear portions of the respective left and right wheels $12M_L$, $12M_R$ are displaced toward each other. That is, each of the left and right wheels $12M_L$, $12M_R$ has a toe-out.

When it is judged that the probability of rollover of the vehicle is high, the braking-force difference establishing control or the in-phase steering control, among the above-described four controls for increasing the understeering tendency, is executed. Described in detail, at a point of time at which it is judged that the probability of rollover of the vehicle is high, it is judged whether the braking force applied to each of the left and right wheels $12M_L$, $12M_R$ can be further increased or not. Specifically, when a difference between the maximum braking force applicable to each of the left and right wheels $12M_L$, $12M_R$ and the braking force currently applied to each of the left and right wheels $12M_L$, $12M_R$ is smaller than a given value, it is not possible to increase the braking force applied to the outside wheel, so that the in-phase steering control is executed. When the difference between the maximum braking force and the currently applied braking force is larger than the given value, namely, when the increase of the braking force is affordable, the braking-force difference establishing control is executed.

In a state in which either one of the braking-force difference establishing control and the in-phase steering control is being executed, there is a case in which a so-called counter-steering is carried out by the vehicle operator, namely, in which the steering operation is carried out in a direction that is opposite to a direction of the steering operation carried out at a point of time of determination that the probability of rollover of the vehicle is high. In such a case, it can be considered that the vehicle operator intents to avoid rollover of the vehicle. Therefore, in this case, one of the camber-angle changing control and the toe-angle changing control is executed for assisting the operation of the vehicle operator. Specifically, at a point of time at which the counter-steering is carried out, it is judged whether or not a change of a yaw rate of the vehicle body 14 is larger than a given value. When the change of the yaw rate is large, it is preferable to quickly manage to avoid rollover of the vehicle, so that the toe-angle changing control is executed because the toe-angle changing control requires a degree of change of the toe angle which is less than a degree of change of the camber angle required by the camber-angle changing control. When the change of the yaw rate is small, the camber-angle changing control is executed.

In the control system according to each of the above-described first and second embodiments, the vehicle-body acceleration, which is estimated from the steering operation and the braking operation, is used for the determination as to whether the probability of rollover of the vehicle is high or not. However, in the control system according to the present third embodiment, it is judged that the probability of rollover of the vehicle is high when the vehicle-body acceleration composed of the actual longitudinal acceleration detected by the longitudinal acceleration sensor 226 and the actual lateral acceleration detected by the lateral acceleration sensor 228 falls in the high rollover-probability region.

Figure 16:
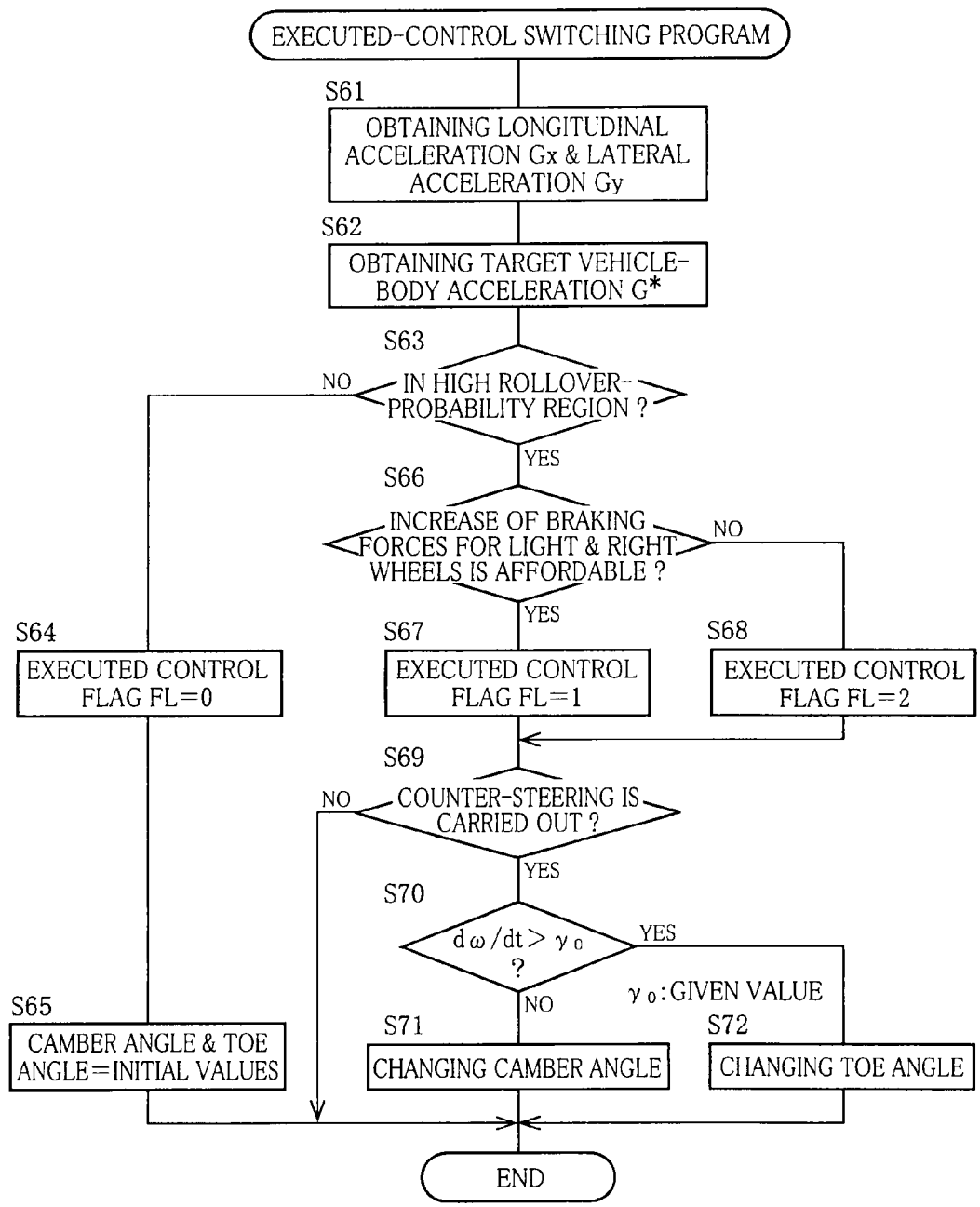
FIG. 16 is a flow chart representing an executed-control switching program that is to be executed by an electronic control unit provided in the vehicle motion control system according to the third embodiment.

The procedures for switching among the normal control and the above-described four controls (as the rollover prevention controls) are carried out by execution of an executed-control switching program shown by flow chart of FIG. 16. The executed-control switching program is repeatedly executed by the ECU 200, at a short time interval Δt (e.g., several milliseconds) while the ignition switch of the vehicle is placed in its ON state. Further, the control of each of the braking devices 22 is carried out by execution of a braking-force control program shown by flow chart of FIG. 17, and the control of the steering device 34 is carried out by execution of a steering control program shown by flow chart of FIG. 18, such that the braking-force control program and the steering control program are carried out for the same period as the executed-control switching program. With reference to the flow charts of FIGS. 16, 17 and 18, there will be briefly described procedures carried out in executions of these programs.

i) Executed-Control Switching Program

In executions of the programs in the control system according to the third embodiment of the invention, there is employed an executed control flag FL indicative of which one of the normal control and the braking-force difference establishing control and in-phase steering control of the rollover prevention control is to be executed. In the executed-control switching program, a value of the flag FL is determined, and each of the steering control, braking force control and damping force control is switched among the normal control, braking-force difference establishing control and in-phase steering control. The value of the flag FL is set to "0" when the normal control is to be executed, and is set to "1" when the normal control is to be executed, and is set to "2" when the in-phase steering control is to be executed.

In execution of the executed-control switching program, in S61 and S62, the longitudinal acceleration Gx and the lateral acceleration Gy are obtained, and the vehicle-body acceleration G is obtained by composing the longitudinal and lateral accelerations Gx, Gy. In S63, it is judged whether the probability of rollover of the vehicle is high or not, based on the vehicle-body acceleration G. In a state of normal running of the vehicle, the executed control flag FL is set to "0" in S64, and the camber angle of each of the four wheels 12 and the toe angle of the each of the left and right wheels $12M_L$, $12M_R$ are controlled to respective initial values. When it is judged that the vehicle-body acceleration G falls in the high rollover-probability region and that the probability of rollover of the vehicle is high, the normal control is switched to the rollover prevention control by implementing S66 and steps following S66.

When it is judged that the probability of rollover of the vehicle is high, S66 is implemented to judge whether an increase of the braking force applied to each of the left and right wheels is affordable or not. When the increase of the braking force is affordable, the flag value of the executed control flag FL is set to "1" in S67. When it is not affordable, the flag value of the executed control flag FL is set to "2". Then, in S69, it is judged whether or not the counter-steering is carried out by the vehicle operator. When the counter-steering is not carried out, S70 and steps following S70 are skipped without their implementations. When the counter-steering is carried out by the vehicle operator, S70 is implemented to judge whether or not a change rate of the yaw rate ω is higher than a given value $\gamma_0$. When the change rate of the yaw rate ω is lower than the given value $\gamma_0$, the above-described camber-angle changing control is executed. When the change rate of the yaw rate ω is higher than the given value $\gamma_0$, the above-described toe-angle changing control is executed. One cycle of execution of the executed-control switching program is completed when the above-described series of procedures have been done.

Figure 17:
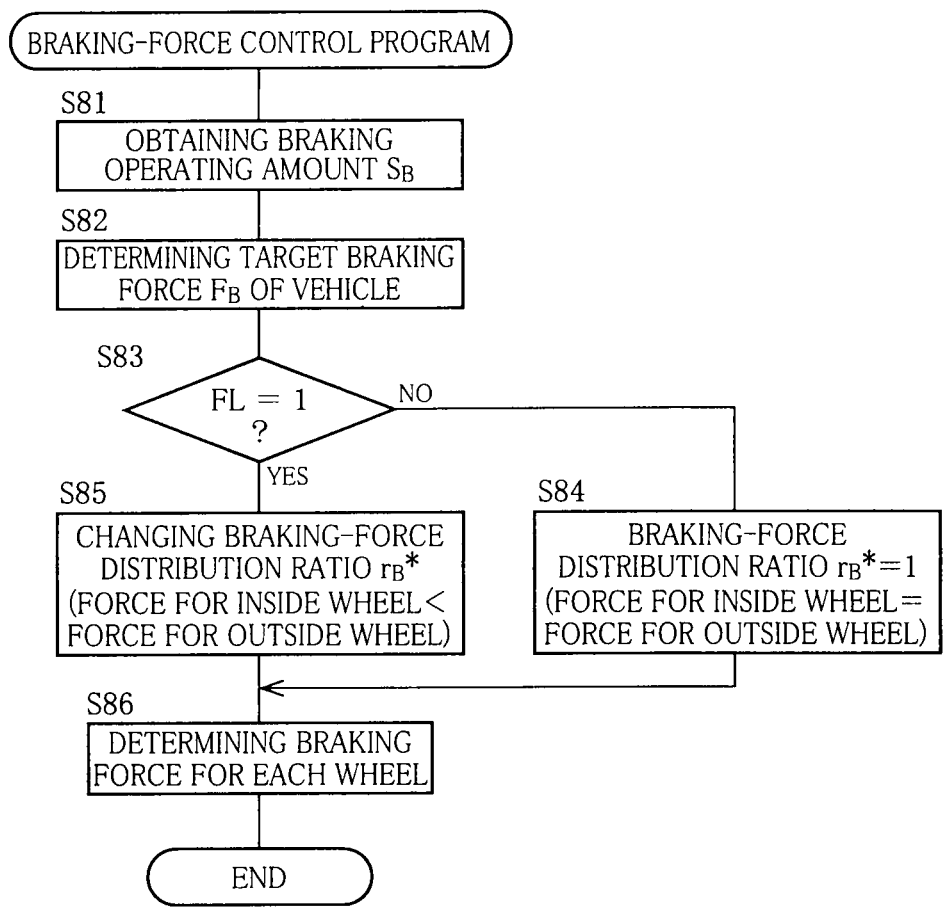
FIG. 17 is a flow chart representing a braking-force control program that is to be executed by the electronic control unit provided in the vehicle motion control system according to the third embodiment.

In the braking-force control program represented by flow chart of FIG. 17, the control is switched based on the flag value of the executed control flag FL, as described above. Normally, in S84, the total braking force is distributed such that the braking force applied to the left wheel 12M$_L$ and the braking force applied to the right wheel 12M$_R$ are substantially equal to each other. On the other hand, when the flag value of the executed control flag FL is "1", S85 is implemented to change the braking-force distribution ratio such that the braking force applied to the outside wheel is larger than the braking force applied to the inside wheel.

Figure 18:
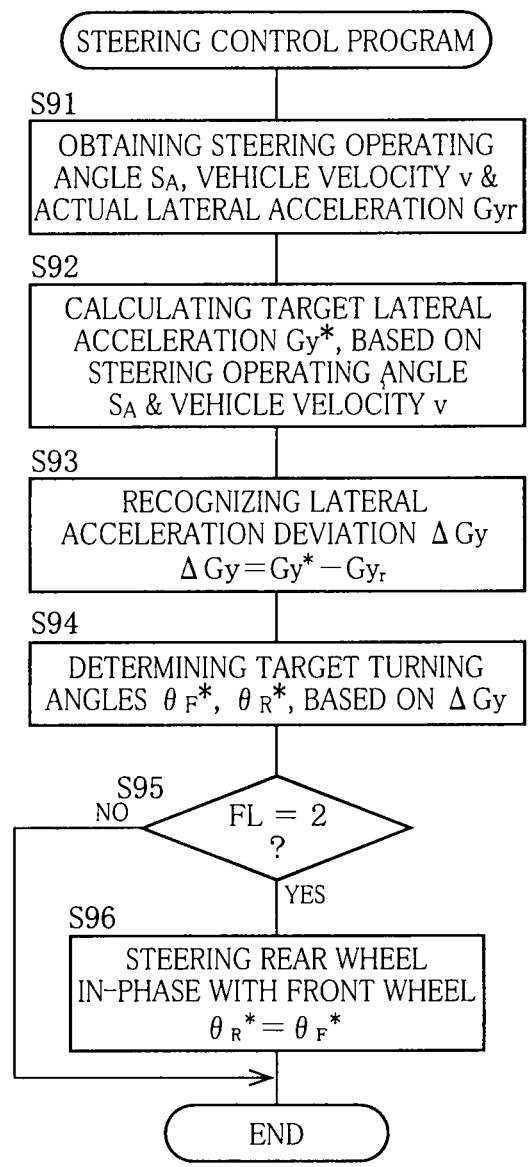
FIG. 18 is a flow chart representing a steering control program that is to be executed by the electronic control unit provided in the vehicle motion control system according to the third embodiment.

In the steering control program represented by flow chart of FIG. 18, the control is switched based on the flag value of the executed control flag FL determined in the executed-control switching program, as described above. Normally, in S91 through S94, the target turning angles $\theta_F^*$, $\theta_R^*$ of the front and rear wheels 12F, 12R are determined based on the lateral acceleration deviation $\Delta$Gy, in accordance with the above-described methods. Further, when the flag value of the executed control flag FL is "2", S96 is implemented to set the target turning angle $\theta_R^*$ of the rear wheel 12R to substantially the same value as the target turning angle $\theta_F^*$ of the front wheel 12F whereby the rear wheel 12R is steered in-phase with the front wheel 12F.

In the control system according to the present third embodiment, the steering-characteristic changing control is executed in place of the motion-amount limit control executed in the control system according to the first embodiment. However, the steering-characteristic changing control may be executed in addition to the motion-amount limit control executed in the first embodiment and/or the vehicle-body tilt control executed in the second embodiment.

[Description Of Reference Signs]

12F: front wheel (steerable wheel) 12M$_L$: left wheel (drive wheel) 12M$_R$: right wheel (drive wheel) 12R: rear wheel (steerable wheel) 14: vehicle body 16F, M$_L$, M$_R$, R: suspension device 20: brake pedal 22F, M$_L$, M$_R$, R: braking device 30: steering wheel 34F, R: steering device 40: accelerator pedal 42M$_L$, M$_R$: driving device 60: coil spring (suspension spring) 62F, M$_L$, M$_R$, R: electromagnetic shock absorber 64: electromagnetic motor 74: electromagnetic motor 80: electromagnetic motor (steering device) 92: electromagnetic motor (braking device) 100: electromagnetic motor (driving device) 200: electronic control unit (ECU) 220: vehicle velocity sensor [v] 222: operating angle sensor [S$_A$] 224: yaw rate sensor [$\omega$] 226: longitudinal acceleration sensor [Gx] 228: lateral acceleration sensor [Gy] 230: sprung-portion vertical acceleration sensor [Gz] 232: acceleration stroke sensor [S$_D$] 234: brake stroke sensor [S$_B$] to 300: steering control portion 302: braking-force control portion 304: absorber-force control portion 306: driving-force control portion 310: target-acceleration determining portion 312: rollover-probability judging portion 320: rollover-prevention control executing portion S$_B$: braking operating amount Gx*: target longitudinal acceleration F$_B$: target braking force (applied to vehicle) F$_{B-F}$, F$_{B-ML}$, F$_{B-MR}$, F$_{B-R}$: target braking force (applied to each wheel) S$_A$: operating angle v: vehicle velocity Gy*: target lateral acceleration Gyr: actual lateral acceleration $\Delta$Gy: target lateral acceleration $\theta_F^*$, $\theta_R^*$: target turning angle F$_{AV}$: vibration damping component V$_S$: sprung-portion absolute velocity C$_S$: damping coefficient F$_{AR}$: roll suppressing component F$_{AP}$: pitch suppressing component F$_{A-F}$, F$_{A-ML}$, F$_{A-MR}$, F$_{A-R}$: absorber force F*: target vehicle-body acceleration G': limited vehicle-body acceleration $\phi$: changeable angle k: correction factor |S$_A$|: steering operation velocity S$_B$': braking operation velocity r$_S$: operation velocity ratio $\Delta$x: target shift amount in longitudinal direction $\Delta$y: target shift amount in width direction F$_{AZ}$x: distance changing component in longitudinal direction F$_{AZ}$y: distance changing component in width direction $\omega$: yaw rate

The invention claimed is:

1. A vehicle motion control system to be installed on a vehicle having a plurality of wheels that include a single front wheel, a right wheel and a left wheel, the single front wheel being disposed in a front portion of the vehicle, the right and left wheels being disposed in respective right and left portions of the vehicle and located on a rear side of the single front wheel, said control system being configured to control motion of the vehicle, said control system comprising:
  a rollover-probability judging portion configured to judge whether or not a vehicle-body acceleration of a body of the vehicle falls in a high rollover-probability region that is defined as a region in which a probability of rollover of the vehicle is high; and
  a rollover-prevention control executing portion configured, when it is judged by said rollover-probability judging portion that the vehicle-body acceleration falls in the high rollover-probability region, to execute a rollover prevention control for controlling the motion of the vehicle so as to reduce the probability of rollover of the vehicle,
  wherein said rollover-probability judging portion is configured to obtain a direction and a magnitude of the vehicle-body acceleration by composing a longitudinal acceleration that is a component of the vehicle-body acceleration in a longitudinal direction of the vehicle and a lateral acceleration that is a component of the vehicle-body acceleration in a width direction of the vehicle,
  and wherein said rollover-probability judging portion is configured to judge whether or not the vehicle-body acceleration falls in the high rollover-probability region that is defined by a threshold whose amount varies depending on the direction of the vehicle-body acceleration, the threshold being represented by a straight line connecting the front and left wheels and a straight line connecting the front and right wheels.

2. The vehicle motion control system according to claim 1, wherein said rollover prevention control is to be executed for controlling the motion of the vehicle such that the vehicle-body acceleration falls outside the high rollover-probability region.

3. The vehicle motion control system according to claim 2, wherein said rollover-probability judging portion is configured to estimate the vehicle-body acceleration of the vehicle body, based on a steering operation and a braking operation, and is configured to judge whether the estimated vehicle-body acceleration falls in the high rollover-probability region.

4. The vehicle motion control system according to claim 1, wherein said rollover prevention control includes a motion-amount limit control that is to be executed for limiting a braking force applied to the vehicle and/or a turning amount of at least one steerable wheel that is constituted by at least one of the plurality of wheels.

5. The vehicle motion control system according to claim 4, wherein said motion-amount limit control is to be executed for limiting both of the braking force and the turning amount of the at least one steerable wheel, such that the turning amount is more limited and the braking force is less limited when a running velocity of the vehicle is low than when the running velocity is high, and such that the turning amount is less limited and the braking force is more limited when the running velocity is high than when the running velocity is low.

6. The vehicle motion control system according to claim 4, wherein said motion-amount limit control is to be executed for limiting both of the braking force and the turning amount, such that the braking force is less limited and the turning amount is more limited when a ratio of a velocity of a braking operation to a velocity of a steering operation is high than when the ratio is low, and such that the braking force is more limited and the turning amount is less limited when the ratio is low than when the ratio is high.

7. The vehicle motion control system according to claim 4, being configured to execute a steering control for controlling the turning amount such that the lateral acceleration becomes a value dependent on a steering operation and to execute a braking force control for controlling the braking force such that the longitudinal acceleration becomes a value dependent on a braking operation,
    wherein said motion-amount limit control is to be executed for limiting the braking force and the turning amount, such that the braking force is limited by controlling the braking force based on a longitudinal component of a target acceleration which is parallel to the longitudinal direction, and such that the turning amount is limited by controlling the turning amount based on a lateral component of the target acceleration which is parallel to the width direction, the target acceleration being a target of the vehicle-body acceleration that is determined so as to fall outside the high rollover-probability region.

8. The vehicle motion control system according to claim 7, wherein the target acceleration is determined in execution of said motion-amount limit control, such that the determined target acceleration has an intermediate direction that is intermediate between a direction of a turning-amount limited acceleration and a direction of a braking-force limited acceleration, and such that the determined target acceleration has a magnitude equalized to a value of the threshold which is dependent on the intermediate direction, the turning-amount limited acceleration being defined as the vehicle-body acceleration which is to fall outside the high rollover-probability region and which is to be obtained by limiting the turning amount without limiting the braking force, the braking-force limited acceleration being defined as the vehicle-body acceleration which is to fall outside the high rollover-probability region and which is to be obtained by limiting the braking force without limiting the turning amount.

9. The vehicle motion control system according to claim 1, wherein said rollover prevention control includes a vehicle-body tilt control that is to be executed for tiling the vehicle body in such a direction that reduces the probability of rollover of the vehicle.

10. The vehicle motion control system according to claim 9, wherein said vehicle-body tilt control is to be executed for tilting the vehicle body such that a center of gravity of the vehicle body is shifted in an opposite direction that is opposite to the direction of the vehicle-body acceleration in a plan view of the vehicle.

11. The vehicle motion control system according to claim 1, wherein said rollover prevention control includes a steering-characteristic changing control that is to be executed for increasing an understeering tendency of the vehicle.

12. The vehicle motion control system according to claim 11, wherein said steering-characteristic changing control includes a control that is to be executed, upon turning of the vehicle, for making a braking force applied to one of the right and left wheels which serves as an outside wheel, larger than a braking force applied to the other of the right and left wheels which serves as an inside wheel.

13. The vehicle motion control system according to claim 11, wherein said steering-characteristic changing control includes a control that is to be executed for changing a camber angle of at least one of the plurality of wheels.

14. The vehicle motion control system according to claim 11, wherein said steering-characteristic changing control includes a control that is to be executed for changing a toe angle of each of the right and left wheels.

15. The vehicle motion control system according to claim 11 to be installed on the vehicle further having a single rear wheel which is a steerable wheel and which is located on a rear side of the right and left wheels,
    wherein said steering-characteristic changing control includes a control that is to be executed for turning the rear wheel in the same direction as the front wheel.

16. The vehicle motion control system according to claim 1, wherein said rollover-probability judging portion is configured to judge whether or not the vehicle-body acceleration falls in the high rollover-probability region that is defined as the region in which the probability of rollover of the vehicle in a diagonally forward direction of the vehicle is high, and
    wherein said rollover-probability judging portion is configured to obtain the direction and the magnitude of the vehicle-body acceleration by composing the lateral acceleration and the longitudinal acceleration that acts in a forward direction of the vehicle.

17. The vehicle motion control system according to claim 1, wherein said rollover prevention control includes a motion-amount limit control that is to be executed for limiting at least a braking force applied to the vehicle.

18. The vehicle motion control system according to claim 1, wherein the vehicle further includes a single rear wheel located at a side of the vehicle opposite the front wheel with respect to an axis of the right and left wheels, the front, left, right and rear wheels being arranged in a diamond configuration.

* * * * *